United States Patent
Nishimoto et al.

(10) Patent No.: US 7,567,674 B2
(45) Date of Patent: Jul. 28, 2009

(54) CONTENT TRANSMISSION APPARATUS, CONTENT RECEPTION APPARATUS, CONTENT TRANSMISSION PROGRAM, AND CONTENT RECEPTION PROGRAM

(75) Inventors: Yusei Nishimoto, Tokyo (JP); Tatsuya Kurioka, Tokyo (JP); Toshihiro Uehara, Tokyo (JP); Seiichi Namba, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 543 days.

(21) Appl. No.: 10/433,068

(22) PCT Filed: Oct. 3, 2002

(86) PCT No.: PCT/JP02/10337

§ 371 (c)(1),
(2), (4) Date: May 29, 2003

(87) PCT Pub. No.: WO03/032574

PCT Pub. Date: Apr. 17, 2003

(65) Prior Publication Data

US 2004/0052379 A1     Mar. 18, 2004

(30) Foreign Application Priority Data

Oct. 3, 2001    (JP) .............................. 2001-307559

(51) Int. Cl.
*H04L 9/00*   (2006.01)
(52) U.S. Cl. .................. 380/281; 380/200; 380/201; 380/277; 380/278; 380/282; 713/164; 713/165; 713/167; 713/189
(58) Field of Classification Search .............. 380/277, 380/278, 281, 200, 201, 282; 713/164, 165, 713/167, 189
See application file for complete search history.

(56) References Cited

U.S. PATENT DOCUMENTS 6,002,694 A    12/1999   Yoshizawa et al. .......... 370/486

(Continued)

FOREIGN PATENT DOCUMENTS

EP    0 768 774    4/1997

(Continued)

OTHER PUBLICATIONS

Patent Abstract of Japan of 2000 115091 Dated Apr. 21, 2000.
Patent Abstract of Japan of 10-290222 Dated Oct. 27, 1998.
Patent Abstract of Japan of 2000-349725 Dated Dec. 15, 2000.
Patent Abstract of Japan of 2000-285820 Dated Oct. 12, 2001.

(Continued)

*Primary Examiner*—Kim Vu
*Assistant Examiner*—Beemnet W Dada
(74) *Attorney, Agent, or Firm*—Ladas & Parry LLP

(57)    ABSTRACT

A content transmission method, a content reception method, an apparatus and a computer program using same, that improve the efficiency of descrambling a scrambled content, make the management of cryptography keys for descrambling easy, and protect the copyright of contents, are provided. A content transmission apparatus 3 that encrypts and transmits contents and a content reception apparatus 5 that receives the encrypted contents are provided. The content transmission apparatus 3 includes a content scrambling unit 7 that encrypts contents using a scrambling key Ks, a content key , a work key Kw, a master key Km, and a multiplexing unit 9 that transmits multiplexed contents. The content reception apparatus 5 includes a separating unit 13 that receives and separates the multiplexed encrypted content, and a content descrambling unit 15 that obtains the contents by descrambling encrypted information separated by the separating unit 13.

24 Claims, 12 Drawing Sheets

U.S. PATENT DOCUMENTS

| | | | |
|---|---|---|---|
| 6,069,957 | A | 5/2000 | Richards |
| 6,073,122 | A * | 6/2000 | Wool ........................... 705/51 |
| 6,249,532 | B1 | 6/2001 | Yoshikawa et al. .......... 370/486 |
| 6,690,795 | B1 * | 2/2004 | Richards .................... 380/203 |
| 6,714,649 | B1 * | 3/2004 | Masuda et al. ................ 380/44 |

FOREIGN PATENT DOCUMENTS

| | | |
|---|---|---|
| EP | 0 969 667 | 1/2000 |
| JP | 7-231440 | 8/1995 |
| JP | 10-290222 | 10/1998 |
| JP | 2000-115091 | 4/2000 |
| JP | 2000-349725 | 12/2000 |
| JP | 2001-285820 | 10/2001 |

OTHER PUBLICATIONS

Tsubakiyama, H., et al., "Security for Information Data Broadcasting System with Conditional-Access Control," Global Telecommunications Conference (1993) and Technical Program Conference Record, IEEE Houston, TX pp. 164-170, 1993.

Yu-Lun Huang, et al., "Practical Key Distribution Schemes for Channel Protection," Computer Software and Applications Conference. COMPSAC 2000, 24$^{th}$ Annual International Taipei, Taiwan (2000) pp. 569-574.

Menezes, E., et al., "Techniques for Distributing Confidential Keys," in *Handbook of Applied Cryptography,* Boca Raton, Fl., CRC Press (1997) pp. 551-553.

* cited by examiner

FIG.2A
SCRAMBLING KEY
RELATED INFORMATION S

BROADCASTER ID
CONTENT ID
SCRAMBLING KEY Ks

FIG.2B
CONTENT KEY
RELATED INFORMATION C

BROADCASTER ID
WORK KEY ID
CONTENT ID
CONTENT KEY Kc

FIG.2C
WORK KEY
RELATED INFORMATION W

BROADCASTER ID
CARD ID
REVISION NUMBER
EXPIRY DATE
WORK KEY ID
WORK KEY Kw

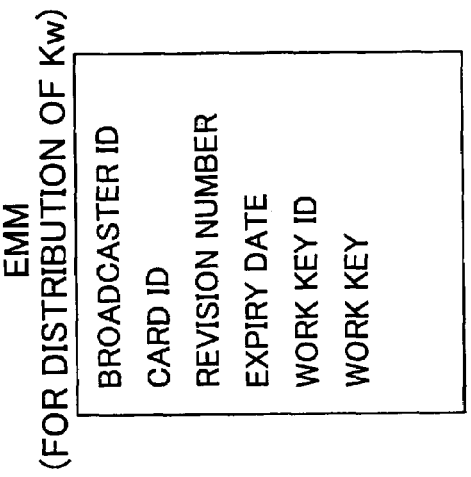

FIG.6E
EMM
(FOR DISTRIBUTION OF Kw)

BROADCASTER ID
CARD ID
REVISION NUMBER
EXPIRY DATE
WORK KEY ID
WORK KEY

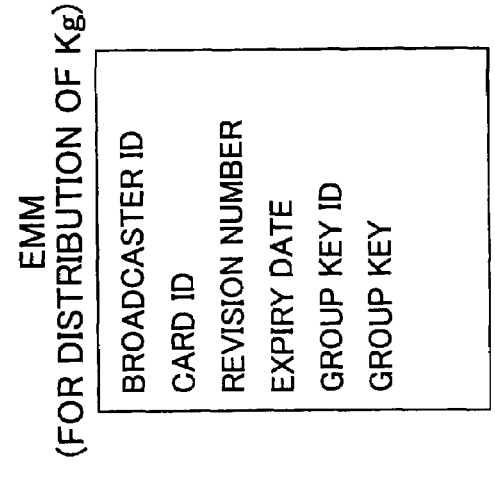

FIG.6F
EMM
(FOR DISTRIBUTION OF Kg)

BROADCASTER ID
CARD ID
REVISION NUMBER
EXPIRY DATE
GROUP KEY ID
GROUP KEY

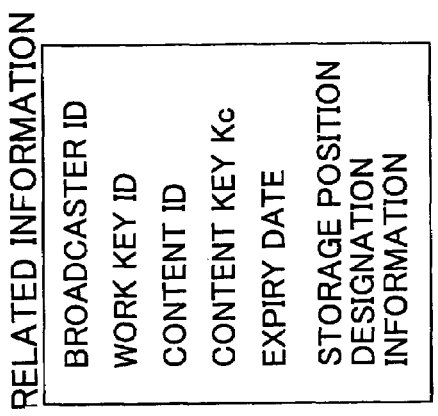

FIG.6C
CONTENT KEY
RELATED INFORMATION

BROADCASTER ID
WORK KEY ID
CONTENT ID
CONTENT KEY Kc
EXPIRY DATE
STORAGE POSITION
DESIGNATION
INFORMATION

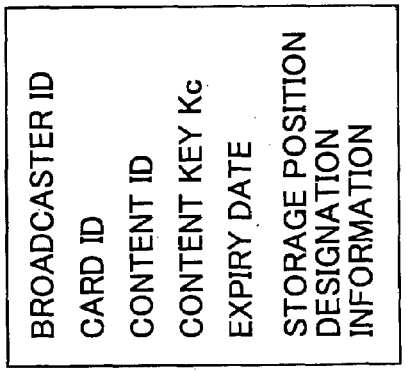

FIG.6D
EMM
(FOR DISTRIBUTION OF Kc)

BROADCASTER ID
CARD ID
CONTENT ID
CONTENT KEY Kc
EXPIRY DATE
STORAGE POSITION
DESIGNATION
INFORMATION

FIG.6A
ECM-Kc

BROADCASTER ID
CONTENT ID
SCRAMBLING KEY Ks

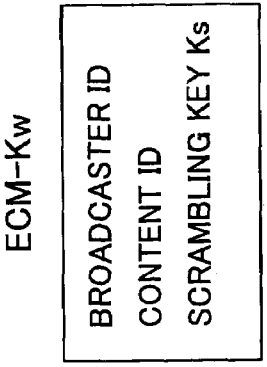

FIG.6B
ECM-Kw

BROADCASTER ID
CONTENT ID
SCRAMBLING KEY Ks

FIG.7

| CONTENT ID | CONTENT KEY Kc | STORAGE DATE | EXPIRY DATE |
|---|---|---|---|
| 1 | | | |
| 2 | | | |
| 3 | | | |
| 4 | | | |
| 5 | | | |
| 6 | | | |
| 7 | | | |
| 8 | | | |
| ... | ... | ... | ... |

NONVOLATILE MEMORY

CONTENT TRANSMISSION APPARATUS, CONTENT RECEPTION APPARATUS, CONTENT TRANSMISSION PROGRAM, AND CONTENT RECEPTION PROGRAM

TECHNICAL FIELD

The present invention relates to a content transmission apparatus and method, a content reception apparatus and method, a content transmission program, and a content reception program, in which a content of digital broadcasting is encrypted at a transmitter side before it is transmitted to limited receivers, and the received content is decrypted at the receiver side before it is consumed by the receivers.

BACKGROUND ART

In the case of a conventional conditional access system for reception of digital broadcasting, a broadcasting station (transmitter side) encrypts a program (content) and only limited receivers (receiver side) are allowed to reproduce the program. The receivers are generally required to have a receiving apparatus that decrypts, in real-time, the broadcasted encrypted content.

The conventional conditional access system for reception will be described with reference to FIG. 12. Japanese satellite digital broadcasting uses a block encryption method to scramble a program (content). As is shown in FIG. 12, in the block encryption method, content is scrambled (encrypted) using a scrambling key (Ks) that is changed in a short term (for example, about one second). Content information about the scrambling key and the content is encrypted using a work key (Kw) that is changed in a long term (for example, about a half year to a year) as an Entitlement Control Message (ECM) (encryption related information). The work key (Kw) and contractual contents of each receiving apparatus are encrypted using a master key (Km) that is commonly retained by the broadcasting apparatus of the transmitter side and the receiving apparatus of the receiver side as an Entitlement Management Message (EMM) (individual related information, including the encrypted work key). The ECM and the EMM are multiplexed with the encrypted content and transmitted together.

At the receiver side in which this multiplexed broadcasting is received, the multiplexed broadcasting is separated to EMM (the entitlement management message including the encrypted work key), ECM (the entitlement control message including the encrypted scrambling key), and the encrypted content. The work key is obtained by decrypting the EMM using the common master key retained by the broadcasting apparatus of the transmitter side. The scrambling key is obtained by decrypting the ECM using the work key. The content is obtained by decrypting the encrypted content using the scrambling key. The decrypted content is stored, if necessary, in a storage device.

Thus, the content is scrambled using the scrambling key, only the limited receivers who are authorized by the broadcasting station (broadcaster) and able to obtain this scrambling key can descramble the scrambled content and reproduce the content. Accordingly, it is not easy for an unauthorized receiver who has no subscription contract with the broadcasting station (broadcaster) and has no specific receiving apparatus, to descramble and reproduce the content. The conventional reception system prohibits an unauthorized receiver from reproducing the content, which enhances the security of the broadcasted content.

The principle of the conditional access system for reception has been described above. The conditional access system for reception includes, for example, a system based on the standard specification "conditional access system for reception for digital broadcasting" (ARIB STD-B25) defined by the Association of Radio Industries and Businesses (ARIB) of Japan.

Thanks to recent increases in the memory capacity of storage devices in receiving apparatuses and recent improvements in user interfaces, more receivers are storing all contents broadcasted by a broadcasting station for tens of hours and afterwards selecting contents as desired instead of storing only selected contents.

In this case, if a pay content is included in the stored contents, the receiver needs to descramble the scramble on the pay content before reproducing the pay content.

The broadcasting station needs to appropriately charge the receiver who reproduces the pay content, while the receiver who reproduces the pay content should be reasonably charged. However, the receiver stores the pay content but sometimes does not reproduce the stored pay content. The receiver would prefer to be charged when the receiver reproduces the stored pay content. In the case of the conventional conditional access system for reception, however, the receiver is charged once they store the descrambled content even if they do not reproduce the descrambled content. Accordingly, a method of descrambling the content when the content is retrieved from the storage device is desired.

The encrypted digital content is usually stored according to the content or the file. The encrypted content can be descrambled according to the content or the file efficiently. The conventional descramble processing, however, is executed by the stream, which degrades the efficiency of the descrambling process.

Furthermore, descrambling by content or file requires many more keys than descrambling by stream, and appropriately controlling so many keys is difficult.

Accordingly, it is an object of the present invention to provide a content transmission apparatus and method, a content reception apparatus and method, a content transmission program, and a content reception program that can eliminate one or more of the above problems by descrambling the scrambled content efficiently, making the control of encryption keys easy to protect the copyright of the content.

DISCLOSURE OF INVENTION

To achieve one or more of the above objects, a content transmission apparatus, referred to in claim 1, that encrypts and transmits contents of digital broadcasting, includes a storing means for storing a scrambling key that changes as time passes, a content key provided to each content, and a master key provided commonly to receiver side; a content encrypting means for generating encrypted contents by encrypting the contents using the scrambling key; a related information encrypting means for generating encrypted related information by encrypting related information related to the contents including at least the scrambling key using the content key; a content key related information encrypting means for generating encrypted content key related information by encrypting related information related to the content key including at least the content key using the master key; a multiplexing means for generating multiplexed encrypted content by multiplexing the encrypted content, the encrypted related information, and the encrypted content key related information; and a multiplexed encrypted content transmitting means for transmitting multiplexed encrypted content multiplexed by the multiplexing means.

According to the above configuration, the content to be transmitted is encrypted into the encrypted content using the scrambling key that changes as time passes. The scrambling key is encrypted into the encrypted related information using the content key provided to each content with the related information related to the content. Additionally, the content key is encrypted into the encrypted content key related information using the master key commonly provided to the receiver side with the related information related to the content key. Then, these items of information are multiplexed and transmitted.

In addition, the related information related to the content includes an authentication number (broadcaster ID) of the transmitter side (broadcaster), a content identifier (content ID) for identifying the content, and so forth. The related information related to the content key includes an authentication number (broadcaster ID) of the transmitter side (broadcaster), the content identifier (content ID) for identifying the content, a work key identifier (work key ID) for identifying the work key, and so forth.

A content transmission apparatus, referred to in claim 2, that encrypts and transmits contents of digital broadcasting, includes: a storing means for storing therein a scrambling key that changes as time passes, a content key provided to each content, a work key retained for a time period longer than a duration of the contents, and a master key provided commonly to a receiver side; a content encrypting means for encrypting the contents using the scrambling key, thereby to obtain encrypted contents; a related information encrypting means for encrypting related information related to the contents including at least the scrambling key using the content key, thereby to obtain encrypted related information; a content key related information encrypting means for encrypting related information related to the content key including at least the content key using the work key, thereby to obtain encrypted content key related information; a work key related information encrypting means for encrypting related information related to the work key including at least the work key using the master key thereby to obtain encrypted work key related information; a multiplexing means for multiplexing the encrypted contents, the encrypted related information, the encrypted content key related information, and the encrypted work key related information, thereby to obtain multiplexed encrypted contents; and a multiplexed encrypted content transmitting means for transmitting the multiplexed encrypted contents multiplexed by the-multiplexing means.

According to the above configuration, the content to be transmitted is encrypted into the encrypted content using the scrambling key that changes as time passes. The scrambling key is encrypted into the encrypted related information using the content key provided to each content with the related information related to the content. Additionally, the content key is encrypted into the encrypted content key related information using the work key that is retained for a time period longer than the duration of the content with the related information related to the content key. The work key is encrypted into the encrypted work key related information using the master key provided commonly to the receiver side with the related information related to the work key. Then, these items of information are multiplexed and transmitted.

The related information related to the work key includes an authentication number (broadcaster ID) of the transmitter side (broadcaster), a security module identifier (card ID) for identifying a security module, an IC card, provided at the transmitter side, a revision number, an expiry date, and a work key identifier (work key ID) for identifying the work key.

A content transmission apparatus, referred to in claim 3, that encrypts and transmits contents of digital broadcasting, includes: a storing means for storing a scrambling key that changes as time passes, a content key provided to each content, a work key retained for a time period longer than a duration of the contents, and a master key provided commonly to a receiver side; a content encrypting means for encrypting the contents using the scrambling key, thereby to obtain encrypted contents; a related information encrypting means for encrypting related information related, to the contents including at least the scrambling key, thereby to obtain encrypted related information; a content key related information encrypting means for encrypting related information related to the content key including at least the content key using the work key, thereby to obtain encrypted content key related information; a work key related information encrypting means for encrypting related information related to the work key including at least the work key using the master key, thereby to obtain encrypted work key related information; a multiplexing means for multiplexing the encrypted content, the encrypted related information, and the encrypted work key related information, thereby to obtain multiplexed encrypted contents; a multiplexed encrypted content transmitting means for transmitting the multiplexed encrypted contents multiplexed by the multiplexing means; and an encrypted content key related information transmitting means for transmitting the encrypted content key related information in at least one of manners in which the encrypted content key related information is transmitted repeatedly in a predetermined interval for a predetermined time period after the multiplexed encrypted content starts to be transmitted, is transmitted repeatedly in a predetermined interval from a predetermined time period before the multiplexed encrypted content starts to be transmitted to a predetermined time period after the multiplexed encrypted content is finished being transmitted, or is transmitted, if the receiver side does not receive the encrypted content key related information, in response to a request from the receiver side or via a communication channel network.

According to the above configuration, the content to be transmitted is encrypted into the encrypted content using the scrambling key that changes as time passes. The scrambling key is encrypted into the encrypted related information using the content key provided to each content with the related information related to the content. Additionally, the content key is encrypted into the encrypted content key related information using the work key that is retained for a time period longer than the duration of the content with the related information related to the content key. The work key is encrypted into the encrypted work key related information using the master key provided commonly to the receiver side with the related information related to the work key. Then, among these items of encrypted information, the encrypted content, the encrypted related information, and the encrypted work key related information are multiplexed and transmitted as the multiplexed encrypted content. Then, the encrypted content key related information transmitting means repeatedly transmits the encrypted content key related information in a predetermined interval for a predetermined time period after the multiplexed encrypted content starts to be transmitted, from a predetermined time period before the multiplexed encrypted content starts to be transmitted to a predetermined time period after the multiplexed encrypted content is finished being transmitted, or transmits in response to a request from the receiver side, or via the communication channel network.

The content reception apparatus, referred to in claim 4, as claimed in claim 2 or 3, may be further characterized in that, in a case in which the receiver side is provided with a security module for storing encrypted content key related information and is inaccessible from an exterior, a plurality of security modules are provided correspondingly to a reception apparatus of the receiver side, the plurality of security modules are grouped into a plurality of groups, and a plurality of work keys are provided each corresponding to one of the plurality of groups of the security modules.

According to the above configuration, in the case in which security modules are provided to the receiver side, the security modules are grouped, and a corresponding work key is provided to each group.

The content transmission apparatus, referred to in claim 5, as claimed in claim 4, may further include a content key related information storage designating means that, when the encrypted content key related information is decrypted into content key related information at the receiver side, and the content key related information is stored as is, or after being re-encrypted, in a case in which a reception apparatus of the receiver side is provided with at least one of a storing means or a storage medium handling means that handles a storage medium, designates one of the security module, the storing means, and the storage medium to retain the content key related information.

According to the above configuration, the content key related information storage designating means designates either the security module, the storing means, or the storage medium to a position at which the content key related information is retained at the receiver side.

The content transmission apparatus, referred to in claim 6, as claimed in any one of claims 1 through 5, may further include a content key related information use designating means that, in a case in which a storage medium handling means is provided at a receiver side, and the encrypted content is stored therein and the encrypted content is reproduced, if an encrypted content key related information corresponding to the encrypted content is already transmitted, does not use the encrypted content key related information and designates stored content key related information.

According to the above configuration, in the case in which the encrypted content is reproduced at the receiver side, and the content key related information including the content key corresponding to the scramble key for descrambling the encrypted content is transmitted, the content key related information use designating means designates the stored content key related information not to use the transmitted content key related information.

The content transmission apparatus, referred to in claim 7, as claimed in any one of claims 4 through 6, may further include an intrinsic key setting related information encrypting means for encrypting a plurality of intrinsic keys into encrypted intrinsic key setting related information; wherein the plurality of intrinsic keys for encrypting information outputted from the security module are set in the security module.

According to the above configuration, when a security module is provided at the receiver side, the intrinsic key to be set in the security module is encrypted by the intrinsic key setting related information encrypting means of the transmitter side using the master key and transmitted as the encrypted intrinsic key setting related information. In addition, the receiver side decrypts the encrypted intrinsic key setting related information using the master key provided in the security module, and obtains the intrinsic key.

The content transmission apparatus, referred to in claim 8, as claimed in claim 7, may be further characterized in that at least one of the plurality of intrinsic keys is set common to another security module.

According to the above configuration, since a common intrinsic key is set in another security module of the receiver side, the information (the content key related information, for example) stored in one security module can be output using the other security module using this common intrinsic key.

A content reception apparatus, referred to in claim 9, that receives encrypted contents of digital broadcasting, encrypted at a transmitter side, may further include: a multiplexed encrypted content receiving means for receiving a multiplexed encrypted content, wherein the transmitter side multiplexes a content encrypted using a scrambling key changing as time passes, a related information related to the content including at least the scrambling key encrypted using a content key provided to each content, a content key related information related to the content key including at least the content key encrypted using a master key provided commonly to the transmitter side, into the multiplexed encrypted content, and transmits the multiplexed encrypted content to the multiplexed encrypted content receiving means; a multiplexed encrypted content separating means for separating the multiplexed encrypted content received by the multiplexed encrypted content receiving means, into the encrypted content, the encrypted related information, and the encrypted content key related information; a multiplexed encrypted content decrypting means for obtaining the content by decrypting the encrypted content key related information using the master key, the scrambling key included in the encrypted related information using the decrypted content key, and the encrypted content using the decrypted scrambling key.

According to the above configuration, the multiplexed encrypted content receiving means receives the multiplexed encrypted content multiplexed at the transmitter side. The multiplexed encrypted content separating means separates the received multiplexed encrypted content into the encrypted content, the encrypted related information, and the encrypted content key related information. Then, the multiplexed encrypted content decrypting means obtains the content key by decrypting the encrypted content key related information using the master key, obtains the scrambling key by decrypting the encrypted related information using this content key, and obtains the content by decrypting the encrypted content using this scrambling key.

A content reception apparatus, referred to in claim 10, that receives encrypted contents of digital broadcasting, encrypted at a transmitter side, may further include: a multiplexed encrypted content receiving means for receiving a multiplexed encrypted content, wherein the transmitter side multiplexes a content encrypted using the scrambling key changing as time passes, a related information related to the content including at least the scrambling key encrypted using a content key provided to each content, a content key related information including at least the content key encrypted using a work key retained for a time period longer than a duration of the content, the work key related information including at least the work key encrypted using a master key provided commonly to the transmitter side, into the multiplexed encrypted content; a multiplexed encrypted content separating means for separating the multiplexed encrypted content received by the multiplexed encrypted content receiving means, into the encrypted content, the encrypted related information, the encrypted content key related information, and the encrypted work key related information; a multiplexed encrypted content decrypting means for obtaining the content by decrypting the encrypted work key related information using the master key, the content key included in the encrypted content key related information using the decrypted work key, the scrambling key included in the encrypted related information using the decrypted content key, and the encrypted content using the decrypted scrambling key.

According to the above configuration, the multiplexed encrypted content multiplexed at the transmitter side is received by the multiplexed encrypted content receiving means. The received multiplexed encrypted content is separated by the multiplexed encrypted content separating means into the encrypted content, the encrypted related information, the encrypted content key related information, and the encrypted work key related information. Then, by use of the multiplexed encrypted content decrypting means, the work key is obtained by decrypting the encrypted work key related information using the master key; the content key is obtained by decrypting the encrypted content key related information using this work key; the scrambling key is obtained by decrypting the encrypted related information using this content key; the content is obtained by decrypting the encrypted content using this scrambling key.

The content reception apparatus, referred to in claim 11, as claimed in claims 9 or 10, may further include an encrypted content key related information requesting means that, if the encrypted content key related information is not received, requests the encrypted content key related information from the transmitter side.

According to the above configuration, in the case in which the encrypted content key related information is not multiplexed in the multiplexed encrypted content, that is, the case in which the encrypted content key related information is transmitted separately, and the encrypted content key related information is not obtained, the encrypted content key related information requesting means requests the encrypted content key related information including the content key from the transmitter side.

The content reception apparatus, referred to in claim 12, as claimed in any one of claims 9 through 11, may further include: a security module inaccessible from an exterior in which the master key is set; and a content key related information storing means for storing decrypted content key related information and a content identifier related to the content key related information for identifying the content.

According to the above configuration, by use of the content key related information storing means, the decrypted content key related information and the content identifier for identifying the content are stored in the security module in which the master key is set.

The content reception apparatus, referred to in claim 13, as claimed in any one of claims 9 through 11, may further include: a security module inaccessible from an exterior in which the master key and intrinsic keys for encrypting information to be output are set; and a content key related information storing means for storing decrypted content key related information and a content identifier related to the content key related information for identifying-the content.

According to the above configuration, the decrypted content key related information and the content identifier for identifying the content are stored, by use of the content key related information storing means, in the security module in which the master key and the intrinsic key are set.

The content reception apparatus, referred to in claim 14, as claimed in claim 13, may be further characterized in that at least one of the intrinsic keys is set commonly to another security module.

According to the above configuration, a security module in which the master key and the intrinsic keys are set shares at least one common intrinsic key with another security module. It is possible to output information (content key related information, for example) stored in one security module with the other security module using the common intrinsic key.

The content reception apparatus, referred to in claim 15, as claimed in claim 13 or 14, may further include: an encrypted intrinsic key setting related information receiving means for receiving encrypted intrinsic key setting related information, wherein the transmitter side encrypts a plurality of intrinsic keys into the encrypted intrinsic key setting related information; and an encrypted intrinsic key setting related information decrypting means for decrypting, using the master key, the encrypted intrinsic key setting related information received by the encrypted intrinsic key setting related information receiving means.

According to the above configuration, in the case in which the intrinsic key is set in the security module, the encrypted intrinsic key setting related information receiving means receives the encrypted intrinsic setting related information encrypted using the master key at the transmitter side, and the intrinsic key is obtained by decrypting the encrypted intrinsic key setting related information by use of the encrypted intrinsic key setting related information decrypting means.

The content reception apparatus, referred to in claim 16, as claimed in any one of claims 12 through 15, may further include a content key related information deleting means that, in a case in which the decrypted content key related information requires more memory capacity than that which the security module can store, deletes the decrypted content key related information based on a time at which the decrypted content key related information is stored and information set by the transmitter side or the receiver side.

According to the above configuration, in a case in which a memory capacity more than memory capacity of the security module is required, the content key related information deleting means deletes the content key related information based on a time at which the content key related information is stored and information set by the transmitter side or the receiver side. For example, even in the case in which an item of content key related information is stored tens of hours before(the content key is not deleted until the content is reproduced, for example), if the information set at the receiver side is prioritized, items of the content key related information of lower priority may be deleted earlier.

The content reception apparatus, referred to in claim 17, as claimed in any one of claims 12 through 16, may further include a content key related information output storing means for outputting and storing the decrypted content key related information stored in the security module.

According to the above configuration, the decrypted content key related information is outputted and stored by the content key related information output storing means.

The content reception apparatus, referred to in claim 18, as claimed in claim 17, may further include a content key related information deleting means that, in a case in which the decrypted content key related information requires more memory capacity than that which the storing means can store, deletes the decrypted content key related information based on a time at which the decrypted content key related information is stored and information set by the transmitter side or the receiver side.

According to the above configuration, in the case in which the memory capacity of the storing means is exceeded, the content key related information deleting means deletes the content key related information based on a time at which the content key related information is stored and the information set by the transmission side or the reception side.

According to claim 19, the content reception apparatus as claimed in any one of claims 12 through 18, may further include a content key related information re-encryption storing means for encrypting the decrypted content key related information stored in the security module using the master key, and outputting and storing therein the encrypted content key related information as re-encrypted content key related information.

The content key related information re-encrypting storing means re-encrypts, using the master key, outputs, and stores the decrypted content key related information stored in the security module.

According to claim 20, the content reception apparatus as claimed in claim 19, may further include a re-encrypted content key related information deleting means that, in a case in which the re-encrypted content key related information and a content identifier for identifying a content require more memory capacity than that which the storing means can store, deletes the re-encrypted content key related information based on a time at which the re-encrypted content key related information is stored or information set by the transmitter side or the receiver side.

According to the above configuration, in the case in which the memory capacity of the storing means is exceeded, the re-encrypted content key related information deleting means deletes the re-encrypted content key related information based on a time at which the content key related information is stored and the information set by the transmission side or the reception side.

According to claim 21, the content reception apparatus as claimed in any one of claims 12 through 16, may further include a content key related information intrinsic encryption storing means for encrypting, using the intrinsic keys, the decrypted content key related information stored in the security module into an intrinsic encrypted content key related information, and outputting and storing the intrinsic encrypted content key related information.

The content key related information intrinsic encryption storing means re-encrypts the decrypted content key related information stored in the security module, and outputs and stores it as the intrinsic encrypted content key related information.

According to claim 22, the content reception apparatus as claimed in claim 21, may further include an intrinsic encrypted content key related information deleting means that, in a case in which the intrinsic encrypted content key related information and a content identifier for identifying a content require more memory capacity than that which the storing means can store, deletes the intrinsic encrypted content key related information based on a time at which the intrinsic encrypted content key related information is stored or information set by the transmitter side or the receiver side.

According to the above configuration, in the case in which the memory capacity of the storing means is exceeded, the intrinsic encryption content key related information deleting means deletes the intrinsic encryption content key related information based on a time at which the intrinsic encryption content key related information is stored and the information set by the transmission side or the reception side.

According to claim 23, the content reception apparatus as claimed in any one of claims 9 through 15, may further include a storage medium handling means for storing re-encrypted content key related information with a corresponding encrypted content; wherein the decrypted content key related information is re-encrypted into the re-encrypted content key related information using the master key.

The decrypted content key related information stored in the security module is encrypted by the storage medium handling means using the master key, and is stored with the encrypted content as the re-encrypted content key related information in the storage medium.

According to claim 24, the content reception apparatus as claimed in any one of claims 13 through 15, may further include a storage medium handling means for storing intrinsic encrypted content key related information with a corresponding encrypted content; wherein the decrypted content key related information is re-encrypted into the re-encrypted content key related information using the intrinsic keys.

The decrypted content key related information stored in the security module is encrypted by the storage medium handling means using the intrinsic key, and stored with the encrypted content as the intrinsic encryption content key related information in the storage medium.

The content reception apparatus may further include: an encrypted content storing means provided with a storing means and a storage medium handling means, that stores, in a storage medium handled by the storage medium handling means, encrypted content encrypted using the scrambling key and encryption related information related to the content including a content identifier for identifying the encrypted content; a related information inputting means, wherein in a case in which, when the encrypted content stored in the storage medium is reproduced, the re-encrypted content key related information corresponding to the encrypted content is stored in at least one of the storing means and the storage medium, the related information inputting means reads and inputs, in the security module, the re-encrypted content related information from the storing means or the storage medium, and inputs the encrypted related information; a scrambling key outputting means that obtains the content key by decrypting the re-encrypted content key related information using the master key, obtains the scrambling key by decrypting the encrypted related information using the content key, and outputs the scrambling key; and an encrypted content decrypting means for decrypting the encrypted content stored in the storage medium using the scrambling key outputted by the scrambling key outputting means.

The encrypted content related information storing means stores the encrypted content and the encrypted related information corresponding to this encrypted content in the storage medium. The related information inputting means inputs the re-encrypted content key related information stored into the storing means or the storage medium in the security module. The scrambling key outputting means obtains the content key by decrypting the re-encrypted content key related information, and obtains the scrambling key by decrypting the encrypted related information using this content key. The encrypted content decrypting means decrypts the encrypted content.

The content reception apparatus may further include: an encrypted content storing means provided with a storing means and a storage medium handling means, that stores, in a storage medium handled by the storage medium handling means, encrypted content encrypted using the scrambling key and encryption related information related to the content including a content identifier for identifying the encrypted content; a related information inputting means, wherein in a case in which, when the encrypted content stored in the storage medium is reproduced, the intrinsic encrypted content key related information corresponding to the encrypted content is stored in at least one of the storing means and the storage medium, the related information inputting means reads and inputs, in the security module, the intrinsic encrypted content related information from the storing means or the storage medium, and inputs the encrypted related information; a scrambling key outputting means that obtains the content key by decrypting the intrinsic encrypted content key related information using the intrinsic key, obtains the scrambling key by decrypting the encrypted related information using the content key, and outputs the scrambling key; and an encrypted content decrypting means for decrypting the encrypted content stored in the storage medium using the scrambling key outputted by the scrambling key outputting means.

The encrypted content related information storing means stores the encrypted content and the encrypted related information corresponding to this encrypted content in the storage medium. The related information inputting means inputs the intrinsic encryption content key related information stored into the storing means or the storage medium in the security module. The scrambling key outputting means obtains the content key by decrypting the intrinsic encryption content key related information, and obtains the scrambling key by decrypting the encrypted related information using this content key. The encrypted content decrypting means decrypts the encrypted content.

The content reception apparatus may further include a content key un-storing means that, in a case in which the encrypted content is not stored during transmission of the encrypted content, does not store content key corresponding to the encrypted content.

In the case in which, by use of the content key un-storing means, the encrypted content is not stored, the content key corresponding to this encrypted content, that is, the encrypted content key related information, is not stored.

The content reception apparatus may further include a content key switching means for switching the content key based on a time at which a content corresponding to the encrypted related information starts to be transmitted and a time at which the content is finished being transmitted.

The content key switching means switches the timing of decrypting the encrypted related information using the content key based on the time at which the content starts to be transmitted and the time at which the content is finished being transmitted.

According to another example embodiment a content transmission program that causes a content transmission apparatus that encrypts and transmits a content of digital broadcasting to operate as: a storing means for storing therein a scrambling key that changes as time passes, a content key provided to each content, a work key retained for a time period longer than a duration of the contents, and a master key provided commonly to a receiver side; a content encrypting means for encrypting the contents using the scrambling key, thereby to obtain encrypted contents; a related information encrypting means for encrypting related information related to the contents including at least the scrambling key using the content key, thereby to obtain encrypted related information; a content key related information encrypting means for encrypting related information related to the content key including at least the content key using the work key, thereby to obtain encrypted content key related information; a work key related information encrypting means for encrypting related information related to the work key including at least the work key using the master key thereby to obtain encrypted work key related information; a multiplexing means for multiplexing the encrypted contents, the encrypted related information, the encrypted content key related information, and the encrypted work key related information, thereby to obtain multiplexed encrypted contents; and a multiplexed encrypted content transmitting means for transmitting the multiplexed encrypted contents multiplexed by the multiplexing means.

According to the above configuration, the content to be transmitted is encrypted into the encrypted content using the scrambling key that changes as time passes. The scrambling key is encrypted into the encrypted related information using the content key provided to each content with the related information related to the content. Additionally, the content key is encrypted into the encrypted content key related information using the work key that is retained for a time period longer than the duration of the content with the related information related to the content key. The work key is encrypted into the encrypted work key related information using the master key provided commonly to the receiver side with the related information related to the work key. Then, these items of information are multiplexed and transmitted.

According to another example embodiment a content reception program that causes a content reception apparatus that receives a content of digital broadcasting encrypted at transmitter side to operate as: a storing means that stores the master key commonly provided to the transmitter side; a multiplexed encrypted content receiving means for receiving a multiplexed encrypted content, wherein the transmitter side multiplexes a content encrypted using the scrambling key changing as time passes, a related information related to the content including at least the scrambling key encrypted using a content key provided to each content, a content key related information including at least the content key encrypted using a work key retained for a time period longer than a duration of the content, a work key related information including at least the work key encrypted using a master key provided commonly to the transmitter side, into the multiplexed encrypted content; a multiplexed encrypted content separating means for separating the multiplexed encrypted content received by the multiplexed encrypted content receiving means, into the encrypted content, the encrypted related information, the encrypted content key related information, and the encrypted work key related information; a multiplexed encrypted content decrypting means for obtaining the content by decrypting the encrypted work key related information using the master key, the content key included in the encrypted content key related information using the decrypted work key, the scrambling key included in the encrypted related information using the decrypted content key, and the encrypted content using the decrypted scrambling key.

According to the above configuration, the multiplexed encrypted content multiplexed at the transmitter side is received by the multiplexed encrypted content receiving means. The received multiplexed encrypted content is separated by the multiplexed encrypted content separating means into the encrypted content, the encrypted related information, the encrypted content key related information, and the encrypted work key related information. Then, by use of the multiplexed encrypted content decrypting means, the work key is obtained by decrypting the encrypted work key related information using the master key; the content key is obtained by decrypting the encrypted content key related information using this work key; the scrambling key is obtained by decrypting the encrypted related information using this content; and the content is obtained by decrypting the encrypted content using this scrambling key.

Other objects, features and advantages of the present invention will become more apparent from the following detailed description when read in conjunction with the accompanying drawings.

BRIEF DESCRIPTION OF THE DRAWINGS

FIGS. 2A through 2C are schematic diagrams for explaining file formats used for packeting scrambling key Ks, content key , and work key Kw, respectively;

FIGS. 6A through 6F are schematic diagrams for explaining file formats of information related to the content key, information related to the work key, and information related to a group key, according to an embodiment of the invention;

FIG. 7 is a schematic diagram for explaining the format of nonvolatile memory;

BEST MODE FOR CARRYING OUT THE INVENTION

A detailed description of an embodiment according to the present invention will now be provided with reference to the drawings.

<Configuration of a Conditional Access System for Reception, in the Case in Which a Content Key and a Content are Transmitted Together>

Figure 1:
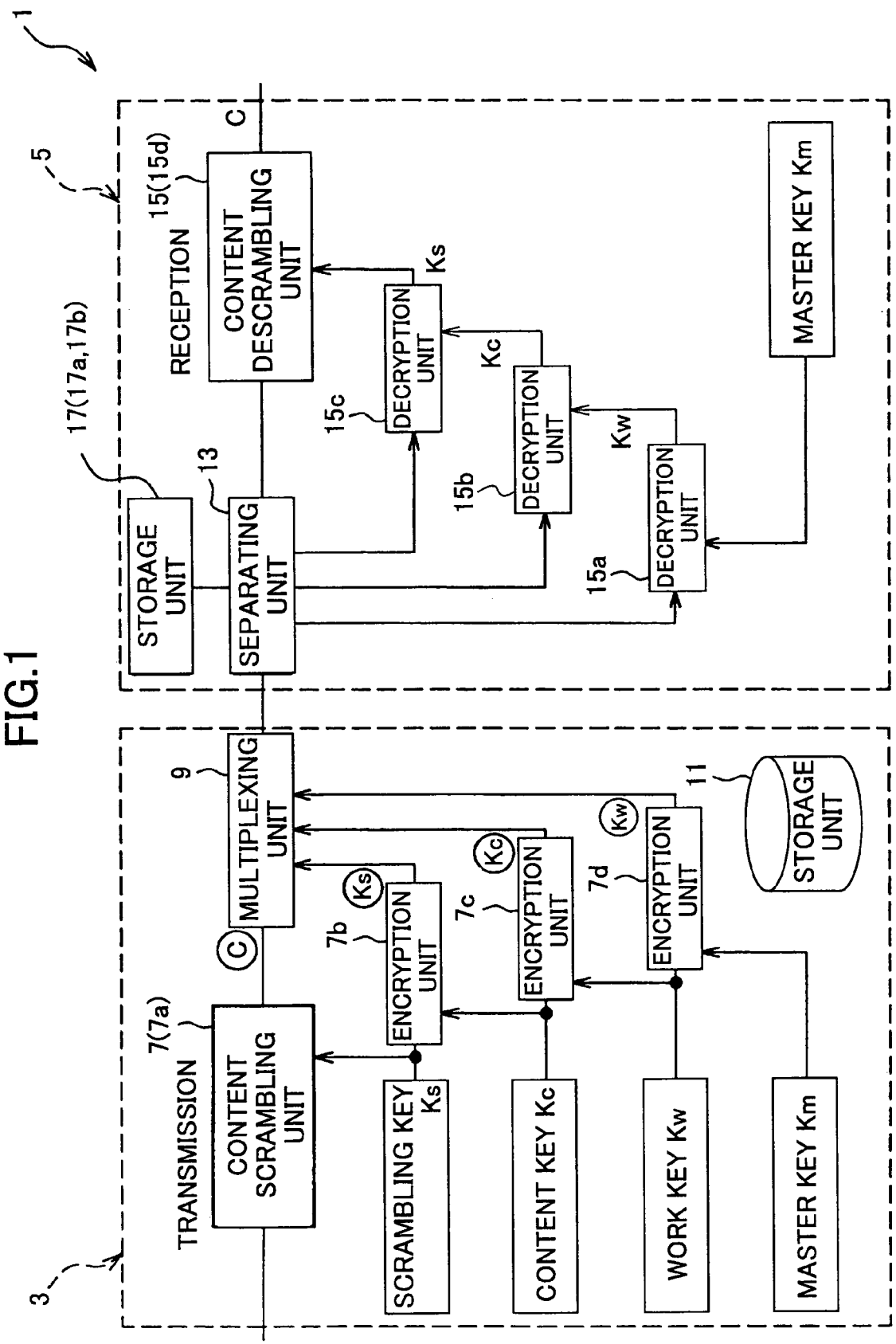
FIG. 1 is a block diagram showing a conditional access system for reception (a content transmission apparatus and a content reception apparatus) according to an embodiment of the present invention.

FIG. 1 is a block diagram showing the entire configuration of a conditional access system for reception 1 according to an embodiment of the present invention. As is shown in FIG. 1, the conditional access system for reception 1 includes a content transmission apparatus 3 and a content reception apparatus 5. The content transmission apparatus 3 includes a content scramble unit 7, a multiplexing unit 9, and a storage unit 11. The content reception unit 5 includes a separating unit 13, a content descramble unit 15, and a storage unit 17.

The conditional access system for reception 1 is a system that transmits encrypted content (program) from a transmitter side and decrypts the encrypted content at a receiver side before the content is used. The conditional access system for reception 1 requires a specific limited receiving apparatus. Accordingly, the system is so called a conditional access system for reception.

The content transmission apparatus 3 encrypts content and transmits it to the content reception apparatus 5 provided at the receiver side. The content transmission apparatus 3 encrypts the content, for example audio visual data, using a master key provided commonly at the transmitter side and the receiver side, and transmits the encrypted content. Accordingly, this method is so called a common key encryption method.

In the content scramble unit 7, the "encrypted content" is generated by encrypting, via an encryption unit 7a (not shown), the content to be transmitted using a scrambling key Ks generated by an encryption key generation unit (not shown). The encryption key generation unit will be described later. The "information related to encryption" is generated by encrypting, via an encryption unit 7b, the information related to the content including at least a scrambling key Ks using a content key stored in the storage unit 11. The "information related to encryption/content key" is generated by encrypting, via an encryption unit 7c, the information related to the content key including at least the content key using a work key Kw stored in the storage unit 11. The "information related to encryption/work key" is generated by encrypting, via an encryption unit 7d, the information related to the work key including at least the work key Kw using the master key Km stored in the storage unit 11.

The corresponding relationship between the content scramble unit 7 of the content transmission apparatus 3 and the components referred to in the claims is as follows: the encryption unit 7a corresponds to a content encrypting means; the encryption unit 7b corresponds to a related information encrypting means; the encryption unit 7c corresponds to a content key related information encrypting means; and the encryption unit 7d corresponds to a work key related information encrypting means.

The multiplexing unit 9 generates a multiplexed encryption content by multiplexing the encrypted content generated by the content scramble unit 7, the encrypted related information, the encrypted content key related information, the encrypted work key related information, and transmits the multiplexed encryption content to the receiver side. The multiplexing unit 9 corresponds to a multiplexing means and a multiplexed encrypted content transmitting means referred to in the claims.

The storage unit 11 stores the scrambling key Ks that may be changed as time passes, the content key provided for each content, the work key Kw that may be retained for a longer time period than the content, and the master key Km, which is provided to the content reception apparatus 5 and is common to the transmitter side and the receiver side.

The encryption key generation unit, although not shown in FIG. 1, generates the encryption keys stored in the storage unit 11.

Although not shown, the content transmission apparatus 3 is also includes an "encrypted content key related information transmission means", a "content key related information storage designating means" and an "intrinsic key setting related information encrypting means."

The "encrypted content key related information transmitting means" transmits the encrypted content key related information in a manner according to at least one of the following: repeatedly transmitting in a predetermined interval for a predetermined time period after the multiplexed encrypted content starts to be transmitted; repeatedly transmitting from a predetermined time period before the multiplexed encrypted content starts to be transmitted to a predetermined time period after the multiplexed encrypted content is finished being transmitted; transmitting, in the case in which the receiver side does not receive the encrypted content key related information, in response to a request from the receiver side; or transmitting via a communication channel.

After the content key related information is obtained by decrypting the encrypted content key related information via the content reception apparatus 5, the "content key related information storage designating means", when storing the content key related information as is, or after it is encrypting, designates one of a security module, a storing means, or a storage medium provided the content reception apparatus 5 includes at least one of the storing means and storage medium handling means that handles the storage medium.

If the receiver side includes a storage medium handling means that handles the storage medium, and the encrypted content key related information is already transmitted, then when the encrypted content stored in the storage medium is reproduced, a "content key related information use designating means" designates not to use the encrypted content key related information but instead to use the retained content key related information.

A plurality of intrinsic keys that are used to encrypt input information are set in the security module set in the content reception apparatus 5. The "intrinsic key setting related information encrypting means" encrypts these intrinsic keys into "encrypted intrinsic key setting related information" via the master key Km.

On the other hand, the content reception apparatus 5 receives the multiplexed encrypted content encrypted and multiplexed by the content transmission apparatus 3. The content reception apparatus 5 decrypts the multiplexed encrypted content and makes the content ready for a user's reproduction.

The separating unit 13 receives the multiplexed encrypted content transmitted from the content transmission apparatus 3 at the transmitter side, and separates it into the encrypted content, the encrypted related information, the encrypted content key related information, and the encrypted work key related information. The separating unit 13 corresponds to a multiplexed encrypted content receiving means and a multiplexed encrypted content separating means referred to in the claims.

The content descrambling unit 15 includes four decryption units (the security module to be described later), and decrypts the encrypted content, the encrypted related information, the encrypted content key related information, the encrypted work key related information separated by the separating unit 13. The decryption unit 15a decrypts the encrypted work key related information using the master key and thereby obtains the work key. The decryption unit 15b decrypts the encrypted content key related information using this work key and thereby obtains the content key. The decryption unit 15c decrypts the encrypted related information using this content key and thereby obtains the scrambling key. The decryption unit 15d decrypts the encrypted content using this scrambling key and thereby obtains the content. The content descrambling unit 15 corresponds to the multiplexed encrypted content decrypting means referred to in the claims.

The storage unit 17 includes a memory unit 17a (corresponding to the storing means referred to in the claims) embedded in the content reception apparatus 5 and a storage medium handling means 17b that stores information in a storage medium.

The content reception apparatus 5 includes a security module SM that is not shown in FIG. 1. The security module SM may be an IC card, for example, that includes at least the decryption units 15a-15c and retains the master key Km. It is impossible to peep at the master key Km from the exterior of the security module SM.

The content reception apparatus 5 includes an encrypted content key related information requesting means, a content key related information storing means, an encrypted intrinsic key setting related information receiving means, an encrypted intrinsic key setting related information decrypting means, a content key related information outputting means, a content key related information re-encryption storing means, a content key related information outputting means, a content key related information re-encryption storing means, a content key related information intrinsic encryption storing means, a content key un-storing means, and a content key switching means (such means not shown). These are programs running on the main control unit (not shown) of the content reception apparatus 5.

If the content reception apparatus 5 does not receive the encrypted content key related information yet, the encrypted content key related information requesting means requests the content transmission apparatus 3 to transmit the encrypted content key related information.

The content key related information storing means relates to the decrypted content key related information, and stores a content identifier to identify the content in the security module SM.

The security module SM is provided with a plurality of intrinsic keys. The content transmission apparatus 3 uses the master key Km to encrypt the plurality of intrinsic keys into "encrypted intrinsic key setting related information". The "encrypted intrinsic key setting related information receiving means" receives this "encrypted intrinsic key setting related information".

The "encrypted intrinsic key setting related information decrypting means" decrypts the "encrypted intrinsic key setting related information" received by the "encrypted intrinsic key setting related information receiving means" using the master key Km.

The content key related information outputting means outputs the decrypted content key related information stored in the security module SM, and stores it in the storage unit 17. The content key related information re-encryption storing means encrypts the decrypted content key related information stored in the security module SM using the master key Km set in the security module SM, outputs it as the re-encrypted content key related information, and stores it in the storage unit 17.

The "content key related information intrinsic encryption storing means" encrypts the decrypted content key related information stored in the security module SM using the intrinsic key (corresponding to the group key Kg to be described later), outputs it as the "intrinsic encrypted content key related information", and stores it in the storage unit 17. The "content key un-storing means" prevents, if the encrypted content is not stored in the storage unit 17, the content key corresponding to the encrypted content (the encrypted content key related information) from being stored.

The content key switching means switches the content keys based on the starting time and the finishing time of the transmission of the content corresponding to the encrypted related information.

A description of the encryption and decryption of the content will be given below.

The content scrambling unit 7 of the content transmission apparatus 3 scrambles the content with the secret key cryptography. The scrambled content is multiplexed with the encrypted related information including the scrambling key Ks, the content key, and the work key Kw, and is transmitted to the content reception apparatus 5. The content separating unit 13 of the content reception apparatus 5 separates the transmitted content into the related information including the keys and the scrambled content. The content descrambling unit 15 descrambles the scrambled content into a plain text (decrypted content).

In the content reception apparatus 5, the content is stored in the storage unit 17, and descrambled by the content descrambling unit 15 when the content is reproduced.

The master key Km is a specific key assigned to the content reception apparatus 5 or the security module SM. The master key Km is written in the content reception apparatus 5 or the security module SM in advance.

A case in which a work key Kw is shared by a plurality of content reception apparatus 5 will be described below.

In the content transmission apparatus 3, a master key Km of a plurality of applicable content reception apparatuses 5 is read from a master key database (not shown) stored in the storage unit 11. Using the master key Km read from the master key database, the work key Kw is encrypted with the secret key cryptography. The related information including the encrypted work key is packeted using the section format of MPEG-2 multiplexing, and the multiplexing unit 9 multiplexes the content into a transport stream. Packeting is realized by, for example, the Entitlement Management Message (EMM) format described in the specification of the conditional access system for reception (STD-B25) of the Association of Radio Industries and Businesses (ARIB) of Japan.

In each content reception apparatus 5, the EMM is extracted from the received MPEG 2 transport stream by the separating unit 13, and is decrypted using the master key Km. The work key Kw is thus obtained. Accordingly, the plurality of content reception apparatuses 5 share the work key Kw.

The content reception apparatus 5 stores and retains the obtained work key Kw in the security module SM. The work key Kw shared by the plurality of content reception apparatuses 5 is updated every month or every year, for example, to secure the work key Kw. The work key Kw may be transmitted independently from the content using an open band width of broadcasting. If necessary, the work key Kw may be distributed by distributing the security module SM in which the work key Kw is stored in advance.

A supplemental description of the scrambling key and the content key is provided below.

The content key encrypts the scrambling key Ks with the secret key cryptography. The encrypted scrambling key Ks is packeted into common information, and the multiplexing unit 9 multiplexes the content into the transport stream. Packeting is realized by the Entitlement Control Message (ECM) described in the standard of the conditional access system (STD-B25) of the ARIB of Japan. The frequency with which the scrambling key Ks is transmitted will be described later.

The content key is an assigned key and unique to each content. The work key Kw encrypts the content key with the secret key cryptography. The encrypted content key is packeted using the section format of MPEG-2 multiplexing method into the common information (content key information), and the multiplexing unit 9 multiplexes the content into the transport stream.

A supplementary description is now provided of a case in which content on the air is reproduced in real-time using the conditional access system for reception 1.

In a case in which the content is reproduced in real-time, the content transmission apparatus 3 begins to transmit the content key (the content key information) from a predetermined time period before the content is transmitted. While the content is transmitted, the content key is repeatedly transmitted in a predetermined interval. After the transmission of the content is completed, the transmission of the content key is terminated.

In a case in which the broadcasted content is stored in the storage unit 17 of the content reception apparatus 5, and the stored content is reproduced, the as-scrambled content is stored in the storage unit 17 of the content reception apparatus 5 until the content is reproduced. When the content is reproduced, the content key is transmitted.

The file formats that are used to packet the scrambling key Ks, the content key, and the work key Kw with reference to FIGS. 2A, 2B and 2C.

Scrambling key related information S (common information S) (FIG. 2A) is program information used to transmit the scrambling key, and includes a broadcaster ID, a content ID, and the scrambling key Ks. The broadcaster ID is an identifier assigned to each broadcaster. The content ID is an identifier assigned to each content uniquely or in compliance with a predefined condition, for example, whether the same content ID or different content ID is to be assigned to a re-broadcasted content. The scrambling key Ks is encrypted using the content key corresponding to the content ID.

The content key related information C (common information C) (FIG. 2B) is common information that is used to transmit the content key, and includes the broadcaster ID, the work key ID, the content ID, and the content key. The broadcaster ID is the identifier assigned to each broadcaster. The work key ID is an identifier that identifies the work key. The content ID is an identifier uniquely assigned to each content. Among these items, at least the content key is encrypted by the work key corresponding to the work key ID.

The work key related information W (separate information W) (FIG. 2C) is separate information for transmitting the work key Kw. The work key related information W includes the broadcaster ID, a card ID, a revision number, an expiry date, a work key ID, and the work key Kw. The broadcaster ID is an identifier assigned to a broadcaster or the specific group of broadcasters. The card ID is an identifier assigned to each one of the security modules SM. The revision number is a number indicating the version of the work key Kw. The expiry date indicates the expiry date of the work key Kw. The work key Kw is encrypted using the master key Km corresponding to the card ID.

<The Relationship Between the Content Reception Apparatus and the Security Module (Configuration)>

Figure 3:
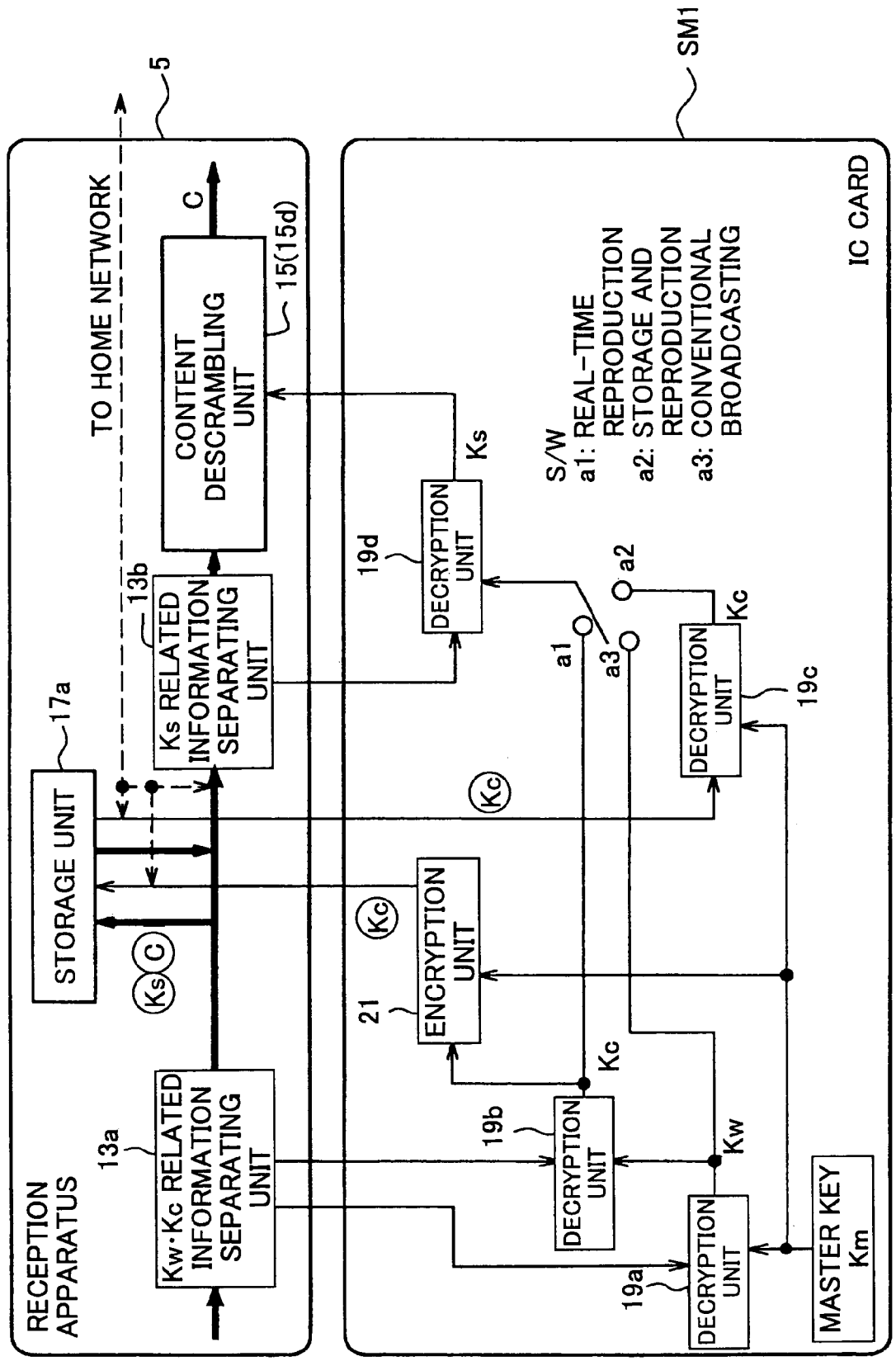
FIG. 3 is a block diagram showing a content reception apparatus and a security module of a conditional access system for reception.

The relationship between the content reception apparatus 5 and an exemplary security module SM1 of the conditional access system for reception 1 will be described with reference to FIG. 3.

The content reception apparatus 5 is configured according to the following: a Kw-related information separating unit 13a that separates related information including the work key Kw and the content key from the received stream (multiplexed encrypted content); a storage unit 17a that stores the encrypted content therein; a Ks related information separating unit 13b that separates related information including the scrambling key Ks; a content descrambling unit 15 that descrambles the content; an interface (not shown) that mediates the communication between the content reception apparatus 5 and the security module SM1; and so forth.

The security module SM1 is provided with the following: the master key Km, four decryption units 19a-19d, an encryption unit 21, and a software switch S/W that controls a plurality of input information items depending on a particular case. The software switch S/W selects one of three inputs a1-a3, where a1 corresponds to a case in which the content is reproduced in real-time, a2 corresponds to a case in which the content is stored and then reproduced, and a3 corresponds to a case of conventional broadcasting.

The Kw-related information separating unit 13a separates the encrypted work key information. If the card ID indicated in the encrypted work key information and the card ID of the security module SM1 (an IC card according to this embodiment) match, the encrypted work key information including the work key Kw, the work key ID, the revision number, the expiry date, and the broadcaster ID is inputted into the security module SM1. In the security module SM1, the decryption unit 19a decrypts the encrypted work key Kw using the master key Km. The work key Kw is correspondingly retained in the security module SM1 with the broadcaster ID, the revision number, the expiry date, and the work key ID.

The Kw-information separating unit 13a separates the encrypted content key information, and inputs the encrypted content key information including the work key ID, the encrypted content key , the broadcaster ID, the expiry date, and the content ID into the security module SM1. In the security module SM1 the decryption unit 19b decrypts the encrypted content key information using the work key Kw corresponding to the work key ID thereby to obtain the content key .

<Reproduction of the Encrypted Content (Real-Time Reproducing)>

The case in which the content on the air is reproduced in real-time using the content reception apparatus 5 and the security module SM1 shown in FIG. 3 will now be described. Since the content is reproduced in real-time, the software switch S/W of the security module SM1 is switched to "a1".

The output of the Kw-related information separating unit 13a is inputted into the Ks related information separating unit 13b. The Ks related information separating unit 13b separates the related information S and inputs the related information S including the content ID and the encrypted scrambling key Ks into the security module SM1. In the security module SM1, the decryption unit 19d decrypts the related information S using the content key corresponding to the content ID. The scramble key Ks is obtained. The scrambling key Ks is outputted to the content reception apparatus 5. In the content reception apparatus 5, the content descrambling unit 15 decrypts the encrypted content using the input scrambling key Ks, and outputs the content.

<Reproduction of the Encrypted Content (Storing and Reproducing)>

The case in which the content stored in the storage unit 17a is reproduced using the content reception unit 5 and the security module SM1 shown in FIG. 3 will now be described. Since the content stored in the storage unit 17a is reproduced, the software switch S/W of the security module SM1 is turned to "a2".

The as-encrypted content is stored (as-scrambled), in the storage unit 17a with the encrypted related information (related information S) including the encrypted scrambling key corresponding to the content ID. The Kw-related information separating unit 13a separates the encrypted content key related information (the content key related information C), and inputs the separated encrypted content key related information including the encrypted content key into the security module SM1. The encryption unit 21 encrypts the content key decrypted by the decryption unit 19b using the master key Km. The encrypted content key is outputted to the content reception apparatus 5, and stored in the storage unit 17a corresponding to the encrypted content.

When the content stored in the storage unit 17a is reproduced, the encrypted content key corresponding to the content to be descrambled is retrieved from the storage unit 17a and inputted into the security module SM1. In the security module SM1, the decryption unit 19c decrypts the input encrypted content key into the content key using the master key Km. The reproduced content is inputted into the Ks related information separating unit 13b. The encrypted related information (the related information S) is separated, and the separated encrypted related information (the related information S) is inputted into the security module SM1.

In the security module SM1, the decryption unit 19d decrypts the input encrypted scrambling key into the scrambling key Ks using the content key decrypted by the decryption unit 19c. The scrambling key Ks is outputted to the content reception unit 5. The encrypted content is decrypted using the scrambling key inputted into the content descrambling unit 15(15d) of the content reception apparatus 5. Accordingly, the content is output.

In the case in which a storage apparatus (not shown) is connected to the content reception apparatus 5 via a home network, for example, the stream (a portion of the multiplexed encrypted content) is stored in the storage apparatus connected to the content reception apparatus 5 via the home network. The content key re-encrypted using the master key Km is stored in the storage apparatus with the encoded content and the encoded related information. When the encrypted content is reproduced, the signal reproduced by the storage apparatus (the as-scrambled content signal) is inputted into the Ks related information separating unit 13b of the content reception apparatus 5 via the home network. At the same time, the re-encrypted content key is inputted into the security module SM1, and is decrypted by the decryption unit 19c. The scrambling key Ks is obtained by the decryption unit 19d, and accordingly the content is descrambled.

<Real-Time Reproduction of the Conventional Digital Broadcasting (Encrypted Content)>

The case in which an encrypted content of the conventional BS digital broadcasting is reproduced using the content reception apparatus 5 and the security module SM1 shown in FIG. 3 will now be described. In this case, because the encrypted content of the conventional BS digital broadcasting is reproduced, the software switch S/W of the security module SM1 is turned to "a3" in advance.

The encrypted work key related information multiplexed with the encrypted content will be described with reference to the file formats shown in FIGS. 6A-6F.

As is shown in FIG. 6, the encrypted work key related information ECM-Kw includes the broadcaster ID, the work key ID, and the scrambling key ID, and so forth. The scrambling key Ks is encrypted using the work key ID corresponding to the work key ID.

The decryption unit 19a, the decryption unit 19d, and the content descrambling unit 15d preferably comply with the encryption method used for BS digital broadcasting. The encrypted work key related information (ECM-Kw) including the encrypted scrambling key Ks is inputted into the decryption unit 19d, and is decrypted using the work key Kw obtained by the decryption unit 19a. The scrambling key Ks obtained by the decryption is outputted to the content reception apparatus 5. The content reception apparatus 5 can then descramble the encrypted content of the BS digital broadcasting.

<Reproduction of the Conventional BS Digital Broadcasting (Encrypted Content) (Storing and Reproducing)>

The case in which the encrypted content of the conventional BS digital broadcasting is stored and then reproduced using a content reception apparatus 5' and the security module SM1 shown in FIG. 9 will now be described. In this case, because the encrypted content of the conventional BS digital broadcasting is reproduced, the software switch S/W of the security module SM1 is turned to "a3" in advance.

<Method of Using Local Encryption>

Figure 9:
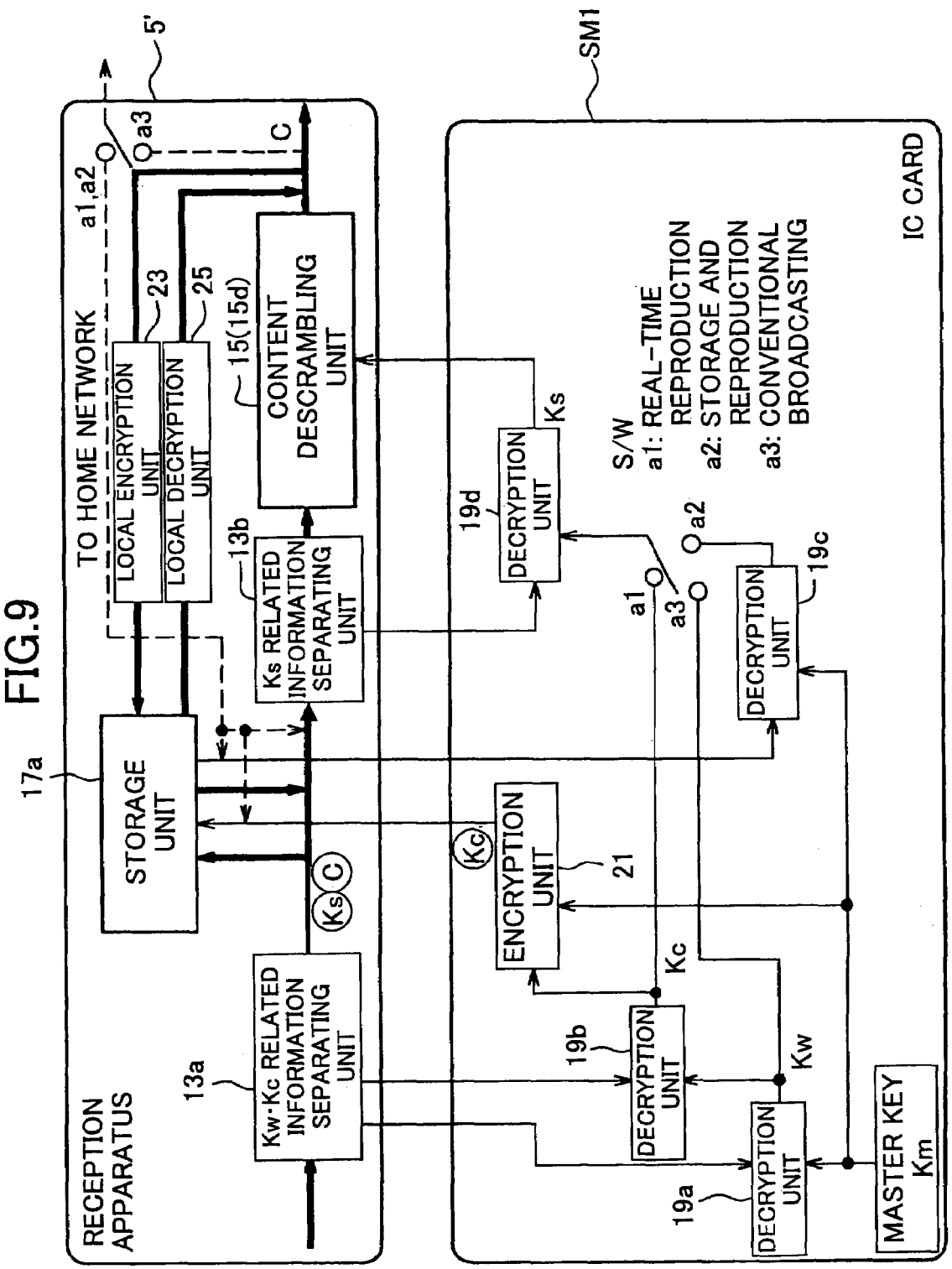
FIG. 9 is a block diagram showing the content reception apparatus and the security module in the case in which a content of conventional BS (broadcasting satellite) digital broadcasting is stored and reproduced.

The content reception apparatus 5' and the security module SM1 used for the method of using the local encryption are shown in FIG. 9.

The encrypted content received in the conventional BS digital broadcasting is temporarily descrambled by the content descrambling unit 15, encrypted by a local encryption unit 23, and stored in the storage unit 17a. In the case of local cryptography, the content is encrypted with the secret key cryptography using an independently generated secret key, and the encrypted content is correspondingly stored in a storage unit with the secret key.

The content encrypted by the local encryption unit 23 is decrypted by the local decryption unit 25 using the secret key used for the encryption of the content. In the case in which the decrypted content is distributed to the storage apparatus (not shown) other than the content reception apparatus 5' via the home network, for example, the decrypted content is encrypted via a content protection technique such as Digital Transmission Content Protection (DTCP). The storage apparatus (not shown) usually encrypts the content with the local cryptography before storing the content therein.

<Method of Using the Work Key Kw>

Figure 10:
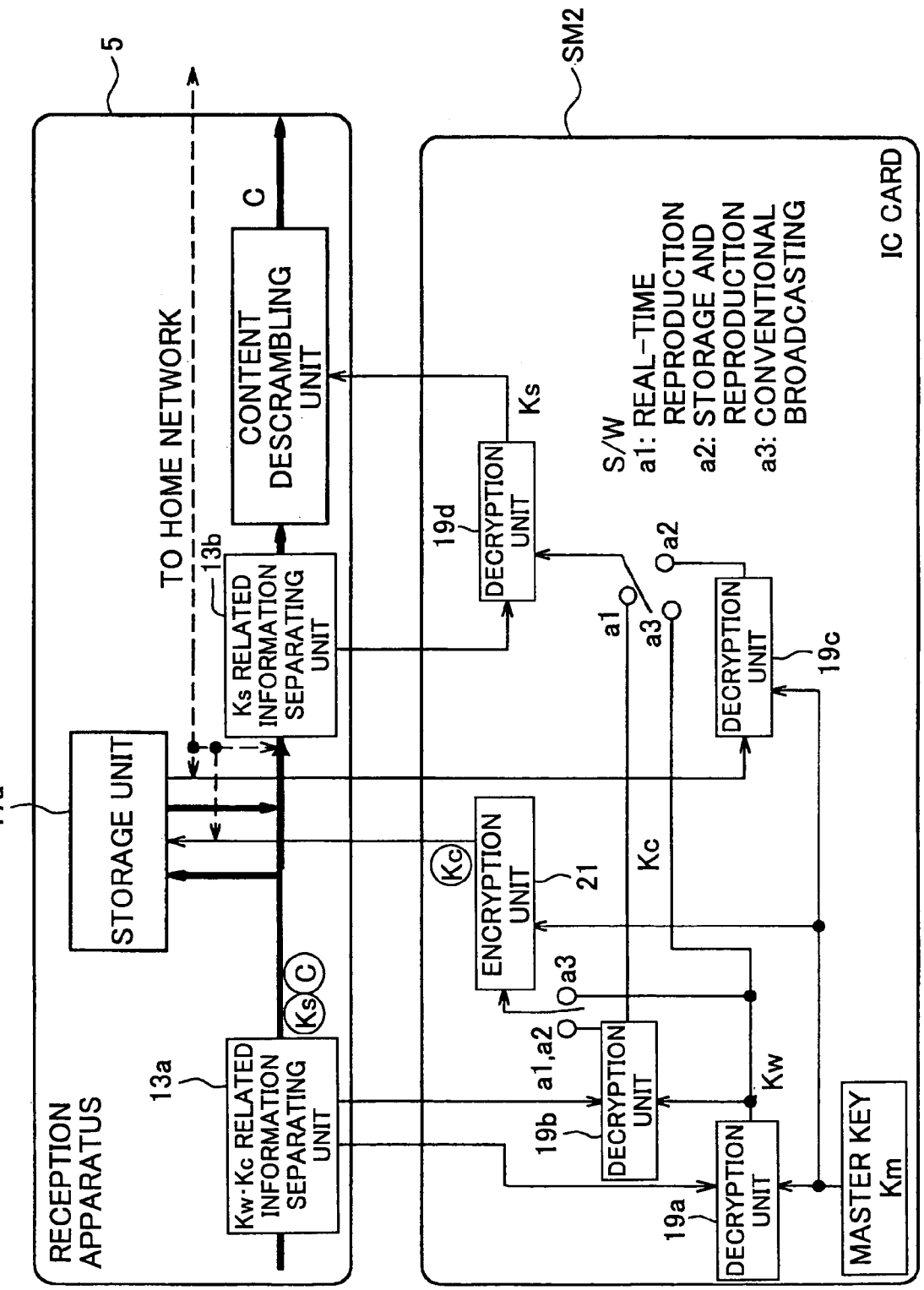
FIG. 10 is a block diagram showing the content reception apparatus and the security module in the case in which a content of conventional BS digital broadcasting is stored and reproduced using the work key.

FIG. 10 shows the content reception apparatus 5 and a security module SM2 used for the method of using the work key Kw. The software switch S/W of the security module SM2 is turned to "a3" in advance.

The as-scrambled content received by the conventional BS digital broadcasting is stored in the storage unit 17a with the encrypted related information ECM-Kw (see FIG. 6B) including the encrypted scramble key. The Kw-related information separating unit 13a inputs the encrypted work key related information EMM (for distribution of Kw, see FIG. 6E) to the security module SM2. The decryption unit 19a decrypts the encrypted work key related information EMM using the master key Km, thereby to obtain the work key Kw. The work key Kw (stored in the security module SM2 before the beginning of the broadcasting of the content) is encrypted using the master key Km by inputting the work key Kw into the encryption unit 21. The encrypted work key Kw is outputted to the content reception apparatus 5. The content reception apparatus 5 correspondingly stores the encrypted work key Kw and the work key ID with the encrypted content stored in the storage unit 17a.

When the encrypted content stored in the storage unit 17a is reproduced, the encrypted work key Kw corresponding to the encrypted content to be descrambled is retrieved from the storage unit 17a, and is inputted into the security module SM2. In the security module SM2, the decryption unit 19c decrypts the encrypted work key Kw using the master key Km, thereby obtains the work key Kw. The encrypted related information ECM-Kw including the scrambling key Ks encrypted by the Ks related information separating unit 13b is separated from the retrieved encrypted content, and is inputted into the security module SM2. In the security module SM2, the software switch S/W is turned to "a2". The encrypted related information ECM-Kw is inputted into the decryption unit 19d, and is decrypted using the work key Kw. The scramble key Ks obtained by the decryption is outputted to the content reception apparatus 5. In the content reception apparatus 5, the scramble key Ks is inputted into the content descrambling unit 15, and the content descrambling unit 15 descrambles the encrypted content.

<Change in Time of the Keys to the Stream (Encrypted Content) Inputted Into the Content Reception Apparatus>

Figure 4:
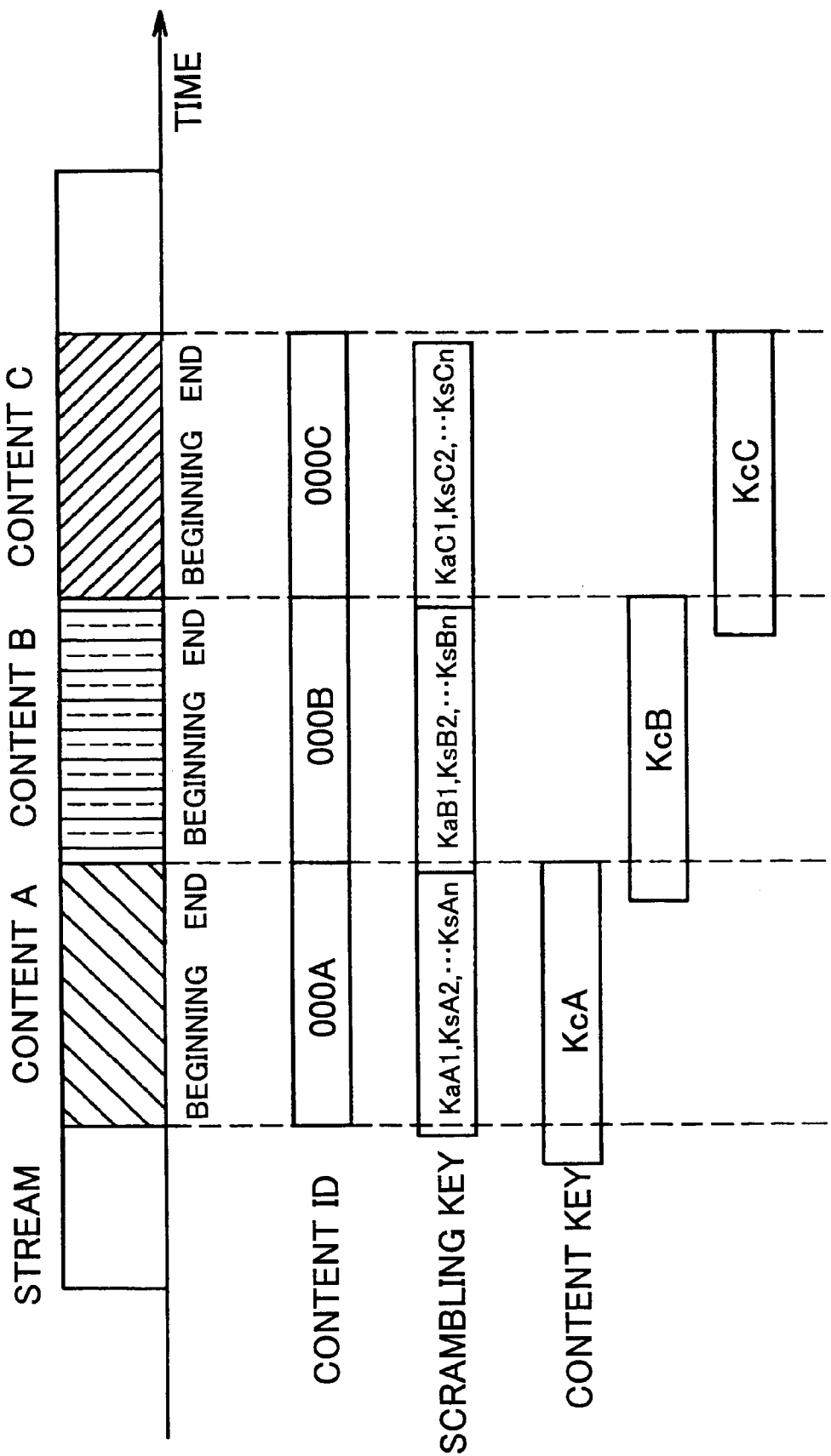
FIG. 4 is a schematic diagram for explaining the change in time of the scrambling key, the content key and the work key in connection with the stream (multiplexed encrypted content) inputted into a content reception apparatus.

The change in time of the scrambling key Ks, the content key, and the work key Kw to the stream (the multiplexed encrypted content) inputted into the content reception apparatus 5 will now be described with reference to FIG. 4. It is assumed in this description that the content is reproduced in real-time. The case in which a content A, a content B, and a content C are broadcasted in series will be described. While the content A is on the air, the content ID 000A is transmitted. When the content B is on the air, the content ID is turned to 000B. When the content C is on the air, the content ID is turned to 000C.

The scrambling key Ks is changed from KsA1 to KsAn by a time period of a few seconds, and is used to scramble the content A. The scrambling key Ks starts to be distributed a few seconds before the beginning of the broadcasting of the content A. That is, the scrambling key Ks used for scrambling content always starts to be distributed before the transmission of the encrypted content scrambled using the scrambling key Ks.

The scrambling key KsB1 starts to be transmitted a few seconds before the content A is switched to the content B. While the content B is on the air, the scrambling key is changed from KsB1 to KsBn by a time period of a few seconds. Likewise, while the content C is on the air, the scrambling key Ks is changed by a time period of a few seconds.

A content key A is the key used for encrypting the scramble keys KsA1 through KsAn. A content key B is the key used for encrypting the scramble keys KsB1 through KsBn. A content key C is the key used for encrypting the scramble keys KsC1 through KsCn. As is shown in FIG. 4, while the content A is on the air, the same content key A is used. When the content A is over and the content B starts, the content key is switched to the content key B. Likewise, when the content C starts to be on the air, the content key is switched to the content key C. The content keys A, B, and C start to be transmitted a few seconds before the corresponding contents are broadcasted. While the corresponding contents are broadcasted, the content keys are repeatedly transmitted by a time period of a few seconds. After the broadcasting of the corresponding contents is finished, the transmission of the content key is terminated. In addition, it is explained in the above description that the "content key" is transmitted. However, what is actually transmitted to the content reception apparatus 5 is the encrypted content key included in the encrypted content key related information.

A supplementary description is provided below on the handling of the keys in a case in which the scrambled content is temporarily stored and then reproduced.

The content ID and the scrambling key Ks are distributed in the same manner as the case in which the content is reproduced in real-time. It is noted that the content key does not need to be transmitted in synchronization (multiplexed) with the content, the content ID, and the scrambling key Ks. The content key only needs to be distributed before the user of the content reception apparatus 5 reproduces the content. For example, the scrambled content and the scrambling key Ks may be stored in the storage unit 17a, and when the broadcaster of the content transmission apparatus 3 permits the stored content to be reproduced, the broadcaster may distribute the content key corresponding to the content. Accordingly, the broadcaster can realize pseudo-video on demand.

<The Relationship Among the Content Reception Apparatus, the Security Module, and the Nonvolatile Memory (Configuration)>

The relationship among the content reception apparatus 5, a security module SM3, and a nonvolatile memory FM of an embodiment of the conditional access system for reception 1 will be described with reference to FIG. 5.

The content reception apparatus 5 includes the following: the Kw-related information separating unit 13a that separates the work key Kw and the content key from the received stream (multiplexed encrypted content); the storage unit 17a that stores the encrypted content therein; the Ks related information separating unit 13b that separates the related information including the scrambling key Ks; the content descrambling unit 15 that descrambles the content; the interface (not shown) that mediates the communication between the content reception apparatus 5 and the security module SM3; and a storage medium (a storage medium handling means 17b (not shown in FIG. 5) that handles a storage medium other than the nonvolatile memory FM).

The security module SM3 includes the master key Km, four decryption units 19a-19d, an encryption unit 21, and three software switches S/W that control a plurality of items of information input depending on the situation. The software switch S/W1 selects one of three inputs a1-a3, where a1 corresponds to the case in which the content is reproduced in real-time, a2 corresponds to the case in which the content is stored and then reproduced, and a3 corresponds to the case of conventional broadcasting. The software switch S/W2 selects one of two inputs of information b1 and b2, and the software switch S/W3 selects one of two inputs of information c1 and c2.

The nonvolatile memory FM stores the content ID and the content key re-encrypted using the master key of the security module SM3. In addition, the nonvolatile memory FM corresponds to a storage medium referred to in the claims.

Figure 5:
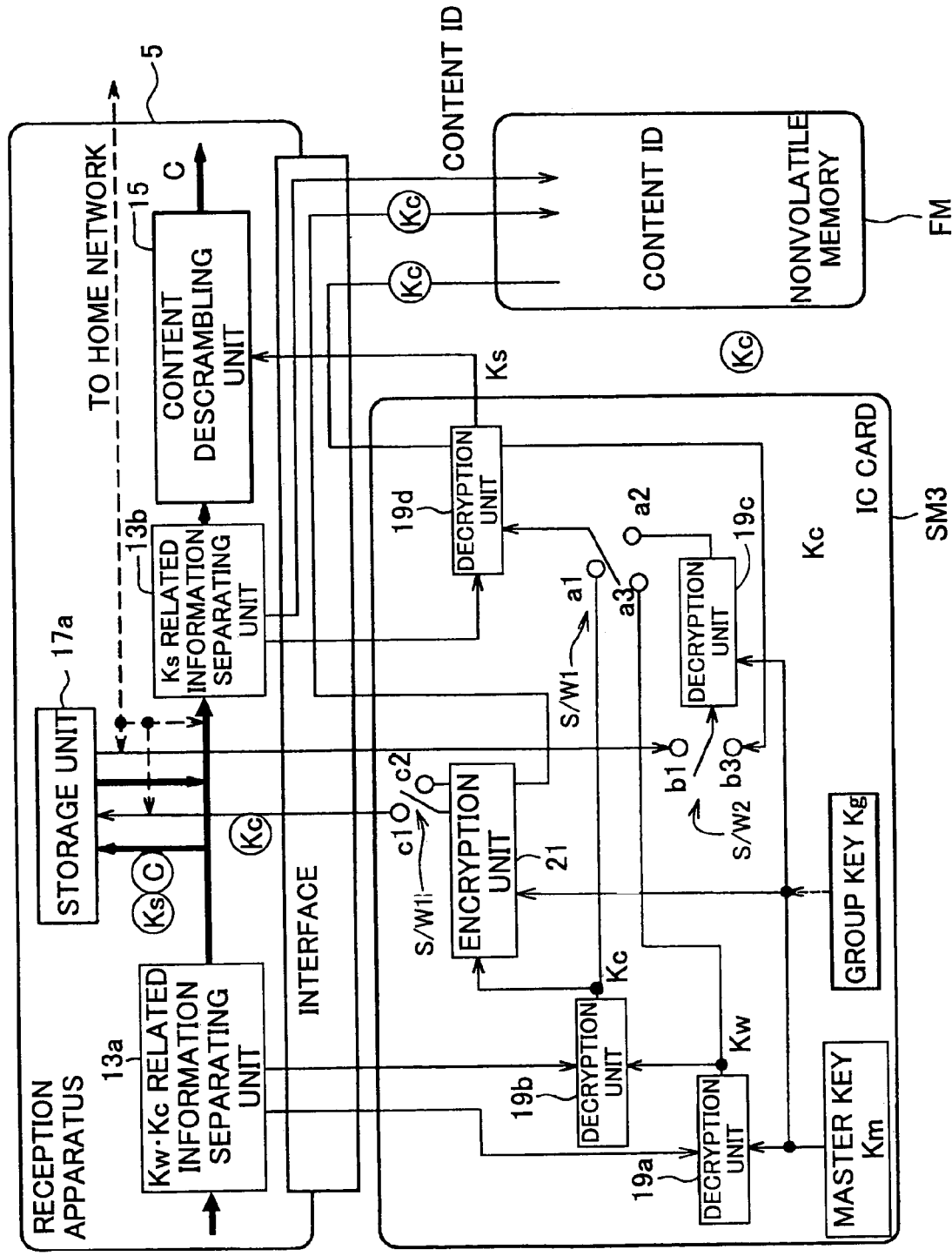
FIG. 5 is a block diagram for explaining the content reception apparatus in the case in which a group key is used.

The content reception apparatus 5 shown in FIG. 5 includes an encrypted content storing means, a related information inputting means, a scrambled key outputting means, and an encrypted content decrypting means. These are (activated) programs running on a main control unit (not shown) of the content reception apparatus 5.

The encrypted content storing means stores the encrypted content using the scrambling key Ks and the encrypted related information about the content, wherein the encrypted related information includes the content identifier to identify the encrypted content in a storage medium (a storage medium provided other than the nonvolatile memory FM) handled by the storage medium handling unit 17b.

In the case in which a re-encrypted content key related information (encrypted using an intrinsic encrypted content key related information: intrinsic key (group key Kg)) corresponding to the encrypted content is stored in at least one of the storage unit 17a and the nonvolatile memory FM, the related information inputting means, when reproducing the encrypted content, reads the re-encrypted content related information (intrinsic encrypted content key related information) from the storage unit 17a or the nonvolatile memory FM, and inputs the re-encrypted content related information and the encrypted related information into the security module SM3.

The scrambling key outputting means obtains the content key by decrypting the re-encrypted content key related information (the intrinsic encrypted content key related information), obtains the scrambling key Ks by decrypting the encrypted related information using this obtained content key, and outputs this obtained scrambling key Ks to the content reception apparatus 5.

The encrypted content decrypting means decrypts the encrypted content using the scrambling key Ks output by the scrambling key outputting means.

<Reproduction of the Encrypted Content in the Case in Which the Content Key is Stored in the Nonvolatile Memory>

When the software switch S/W3 is turned to "c1", the re-encrypted content key encrypted by the encryption unit 21 is stored in the storage unit 17a. When the software switch S/W3 is turned to "c2", the re-encrypted content key encrypted by the encryption unit 21 is stored with the corresponding content ID in the nonvolatile memory FM provided outside the security module SM3.

In the case in which the content key is stored with the encrypted content in the storage unit 17a, when reproducing the encrypted content stored in the storage unit 17a, the re-encrypted content key read from the storage unit 17a is input into the security module SM3 by turning the software switch S/W2 to "b1", and the content key is obtained by decrypting the re-encrypted content key with the encryption unit 19c. The scrambling key Ks is obtained by decrypting the encrypted scrambling key Ks obtained by the Ks related information separating unit 13b using this content key. The content descrambling unit 15 descrambles the encrypted content using this scrambling key Ks, thereby to obtain the content.

In the case in which the re-encrypted content key is stored not in the storage unit 17a where the encrypted content is stored but in the nonvolatile memory FM, the content ID of the encrypted content to be reproduced is separated with the Ks related information separating unit 13b by turning the software switch S/W2 to "b2" and inputted into the nonvolatile memory FM.

In the nonvolatile memory FM, the re-encrypted content key corresponding to the input content ID is selected, and is inputted into the security module SM3. In the security module SM3, the decryption unit 19c decrypts the input re-encrypted content key using the master key Km, thereby to obtain the content key. The decryption unit 19d decrypts the encrypted related information ECM- using this content key, thereby to obtain the scrambling key Ks. The content is obtained by the content descrambling unit 15.

The file format of the related information in the case in which the nonvolatile memory FM is attached to the content reception apparatus 5 will now be described with reference to FIG. 6C.

The content key related information includes the broadcaster ID, the work key ID, the content ID, the content key, the expiry date, and the storage position designation information.

The storage position designation information is control information indicating whether the re-encrypted content key is stored in the storage unit 17a with the encrypted content or the re-encrypted content key is stored in the nonvolatile memory FM at the transmission side (broadcasting station side). The Kw-related information separating unit 13a of the content reception apparatus 5 inputs the content key related information to the security module SM3, and the security module SM3 controls the storage position of the content key by switching the software switch S/W3 based on the storage position designation information indicated in the content key related information.

The expiry date indicated in the content key related information is the expiry date of the content key in which the content key remains valid. The content key becomes invalid after this expiry date. The information of the expiry date is stored with the re-encrypted content key in the storage unit 17a or the nonvolatile memory FM. That is, when the decryption unit 19c of the security module SM3 decrypts the re-encrypted content key, the decryption unit 19c is controlled based on the expiry date. If it is before the expiry date, the decryption unit 19c decrypts the re-encrypted content key.

FIG. 7 illustrates the recording format of the nonvolatile memory FM. The nonvolatile memory FM stores and controls the content ID, the content key (the re-encrypted content key), the date and time at which the content key is stored, the expiry date of the content key (expiry information), and correlated the information.

In the case in which the re-encrypted content key is stored in the nonvolatile memory FM, when the accumulative amount of data required to be stored in the nonvolatile memory FM exceeds the memory capacity of the nonvolatile memory FM, the re-encrypted content key and the content ID, the date and time of storage, and the expiry date corresponding to the re-encrypted content key are deleted in the order of the oldest to newest date and time of the storage by referring to the date and time of the storage. Alternatively, for example, regardless of the memory capacity, the re-encrypted content key, the content ID, the date and time of storage, and the expiry date corresponding to the re-encrypted content key that go beyond the expiry date may be deleted by referring to the expiry date.

<Sequence Chart Showing the Obtaining of the Content Key>

Figure 8:
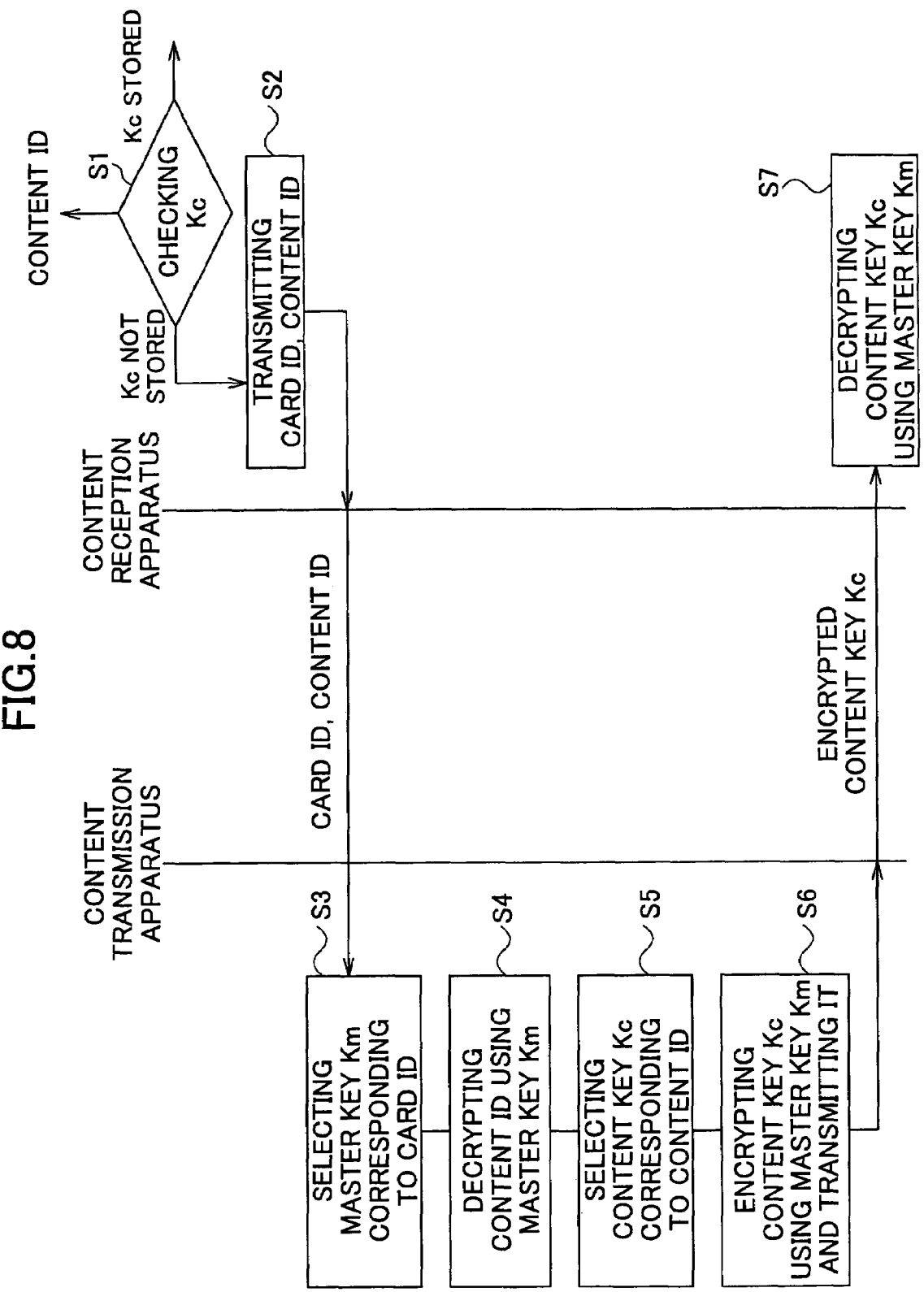
FIG. 8 is a sequence chart showing the process of obtaining the content key.

FIG. 8 is a sequence chart showing the manner by which the content key is obtained.

Initially, a determination is made as to whether the re-encrypted content key is stored in the storage unit 17a with the encrypted content to be reproduced (S1). If it is determined that the re-encrypted content key is stored in the storage unit 17a, the re-encrypted content key is used. If it is determined that the re-encrypted content key is not stored in the storage unit 17a, the content ID of the encrypted content is inputted into the security module SM3.

A determination is made as to whether the target content key (the re-encrypted content key) is stored in the nonvolatile memory FM or the security module SM3. If the target content key (the re-encrypted content key) is found in the security module SM3 or the nonvolatile memory FM, the found content key is used. If the target content key is not stored in any of the content reception apparatus 5, the security module SM3, or the nonvolatile memory FM, the content reception apparatus 5 requests, via the Internet or a public communication channel network, the content transmission apparatus 3 to transmit the content key. In this case, the content reception apparatus 5 transmits the card ID and the content ID to the content transmission apparatus 3 (S2). In addition, when requesting the content transmission apparatus 3 to transmit the content key, if the content reception apparatus 5 encrypts the content ID using the master key Km, the content transmission apparatus 3 can identify the content reception apparatus 5 that transmits the request.

The content transmission apparatus 3 that receives the request for transmitting the content key includes a master key database for managing the master key Km by correlating the master key Km and the card ID, and a content key database for managing the content key by correlating the content key and the content ID. The master key Km corresponding to the received card ID is selected from the master key database (S3). The content ID is obtained by decrypting the received encrypted content ID using the selected master key Km (S4).

The content key corresponding to the obtained content ID is selected from the content key database (S5). In the case in which the content key is distributed via the communication channel network, the content key is encrypted using the selected master key Km and transmitted to the content reception apparatus 5 as the encrypted content key (S6). The content reception apparatus 5 decrypts the received encrypted content key using the master key Km, and uses the content key to reproduce the encrypted content (S7).

In the case in which the content key is distributed on the airwaves, the content key is encrypted using the selected master key Km, and is distributed (broadcasted) as an EMM (for the distribution of, see FIG. 6D). The broadcaster ID, the card ID, the content ID, the content key, the expiry date, and the storage position designation information are included in this EMM (for distribution of).

<Conditional Access System for Reception Using the Group Key>

The case in which the content key is encrypted using the master key Km stored in the security module SM1-SM3, and the encrypted content is stored in the storage unit 17a or the nonvolatile memory FM (storage medium) is described above. The case in which the content key is encrypted using the group key Kg instead of the master key Km stored in the security module will now be discussed.

The group key Kg is shared by a plurality of content reception apparatuses 5. Before the security module is distributed, the group key Kg correlated to a group key ID is stored in the security module, which is an identifier of a group key.

The group key Kg corresponds to an intrinsic key after grouping referred to in the claims.

The content reception apparatus 5 in the case in which the group key Kg is used will be described with reference to FIG. 5. When the encrypted content is stored, the content key related information (including the encrypted content key) is extracted by the Kw·related information separating unit 13a, and is inputted into the security module SM3. In the security module SM3, the decryption unit 19c decrypts the input encrypted content key using the work key Kw. The decrypted content key is inputted into the encryption unit 21, and is re-encrypted using the group key Kg. The re-encrypted content key is stored in the storage unit 17a or the nonvolatile memory FM corresponding to the content ID. The content key re-encrypted using the group key Kg corresponds to the intrinsic encrypted content key related information referred to in the claims.

When the encrypted content is reproduced, the content key encrypted using the group key Kg is retrieved from the storage unit 17a or the nonvolatile memory FM, and is inputted into the security module SM3. In the security module SM3, the input encrypted content key is inputted into the decryption unit 19c, and is encrypted using the group key Kg. The scrambling key, Ks is decrypted using the obtained content key.

A supplemental description will now be provided. The master key Km is assigned to each security module SM, and is not rewritable. Rather, the group key Kg is rewritable.

<Handling the Encrypted Content Among a Plurality of Content Reception Apparatuses>

The case in which there are a plurality (two) of content reception apparatuses 5 (5A, 5B, not shown), and the encrypted content received by one of the content reception apparatuses 5B is stored in a removable medium such as a DVD, and is reproduced by another one of the content reception apparatuses 5A will now be described.

It is assumed that the encrypted content stored using the group key Kgb (the group key assigned to the security module SM3B (not shown) set in the content reception apparatus 5B) by the content reception apparatus 5B is stored in the removable media, for example, and the encrypted content is reproduced by handling this removable media with the content reception apparatus 5A.

Figure 11:
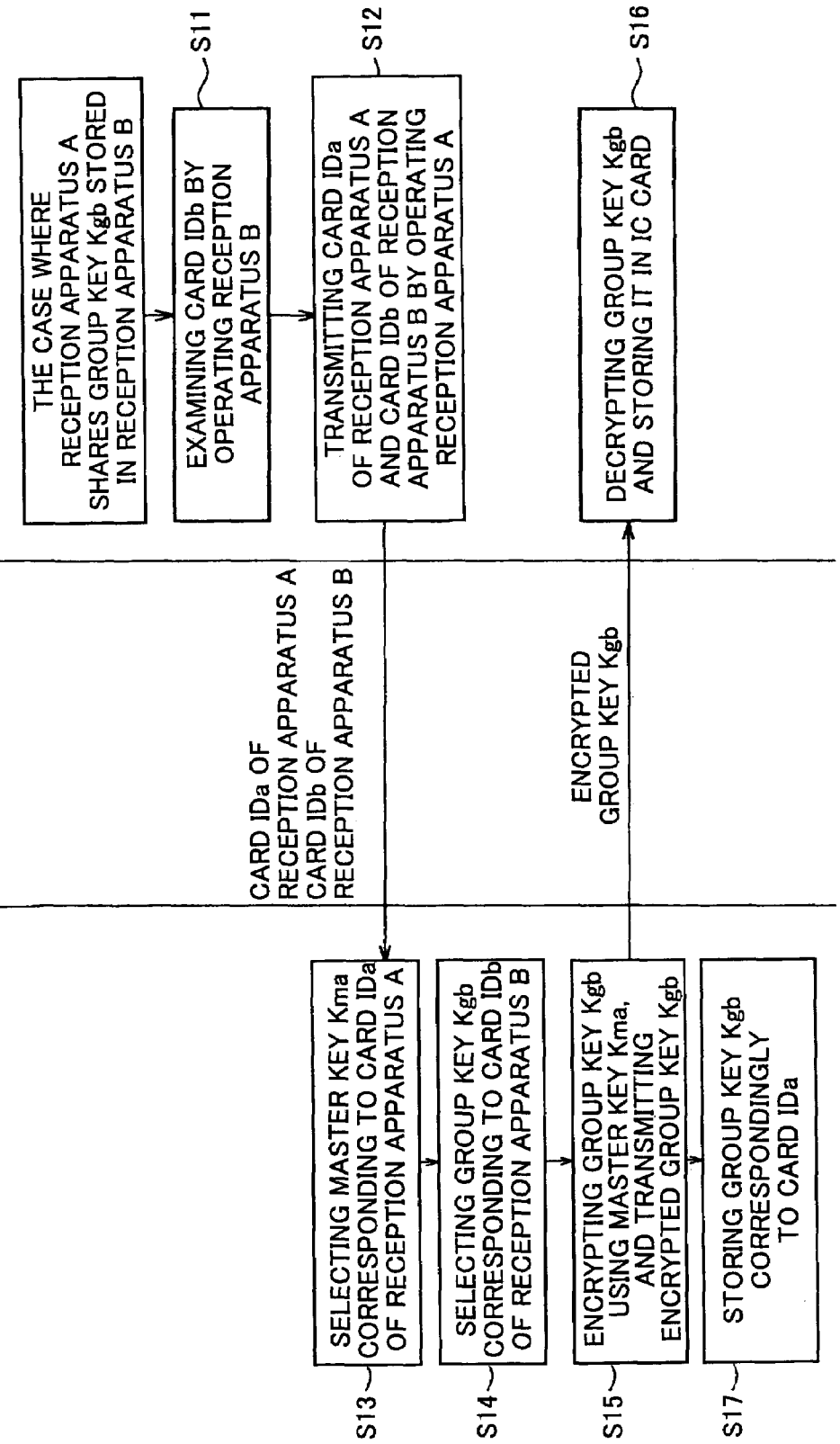
FIG. 11 is a sequence chart showing a process of obtaining the group key.
Figure 12:
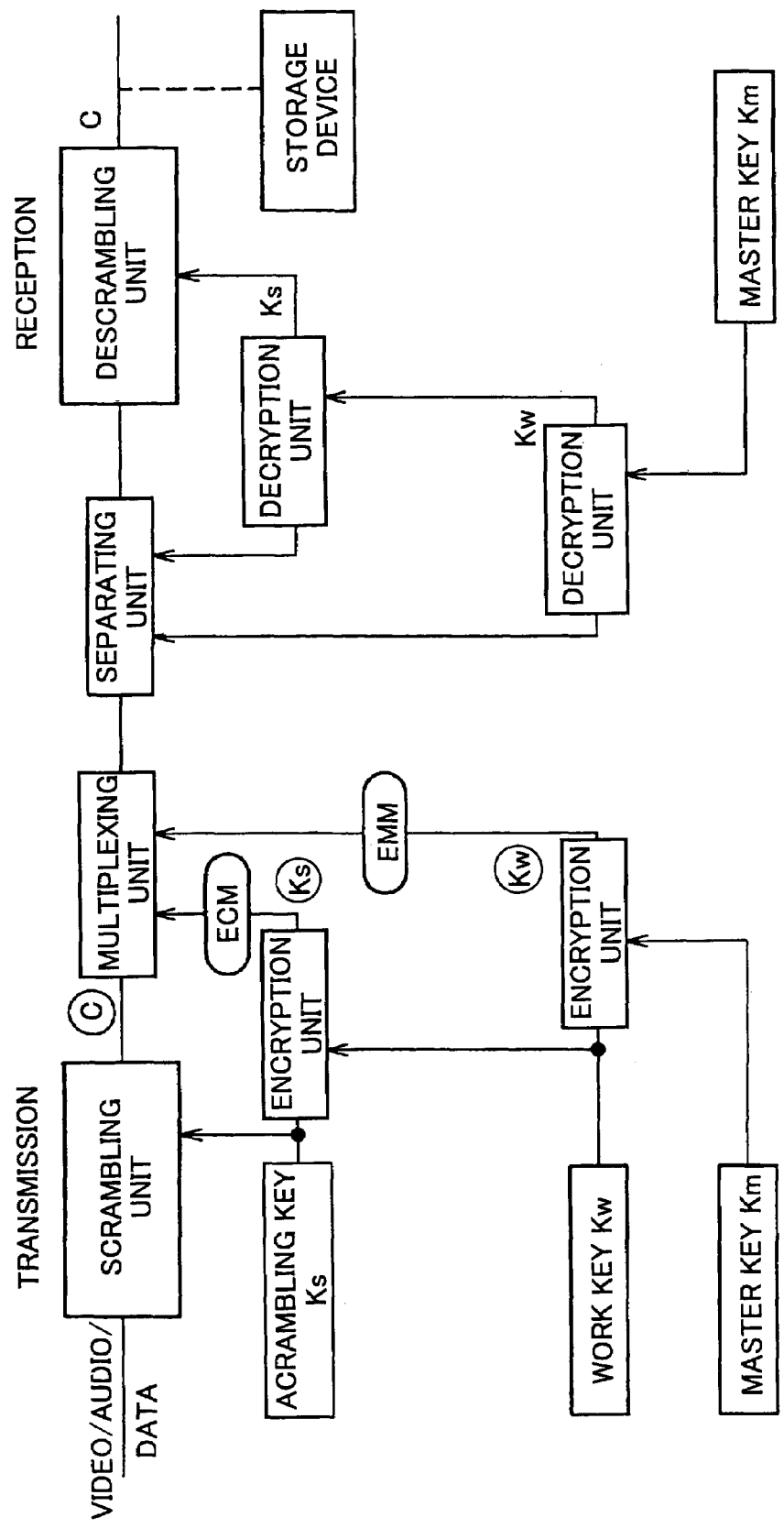
FIG. 12 is a block diagram showing a conventional conditional access system for reception.

A group key Kga (the group key assigned to the security module SM3A (not shown) set in the content reception apparatus 5A) is stored in the security module SM3A (not shown) set in the content reception apparatus 5A. However, even if one tried to reproduce the encrypted content stored by the content reception apparatus 5B using the content reception apparatus 5A, one could not decrypt the encrypted content key using the group key Kgb and nor could one reproduce the encrypted content. Accordingly, a method of storing the group key Kgb set in the security module SM3B (not shown) set in the content reception apparatus 5B, in the security module SM3A set in the content reception apparatus 5A will now be described with reference to FIG. 11.

A user examines the card IDb of the content reception apparatus 5B using an interface (not shown) that displays the card ID of the security module SM3B on a display means (not shown) by operating the content reception apparatus 5B (S11). The user inputs the card IDb to the security module SM3A set in the content reception apparatus 5A by operating the content reception apparatus 5A. The user transmits the input card IDb and the card IDa of the security module SM3A set in the content reception apparatus 5A to the content transmission apparatus 3 at the transmitter side (broadcaster) (S12).

The content transmission apparatus 3 includes a master key-group key database for managing the master keys Km and the group keys Kg corresponding to the card ID in the storage unit 17a. In the content transmission apparatus 3, the master key Kma corresponding to the received card IDa is selected from the master key · group key database (S13). The group key Kgb corresponding to the received card IDb is selected from the master key · group key database (S14).

In the case in which the group key Kgb is distributed through the communication channel, the group key Kgb is encrypted using the master key Kma, and transmitted to the content reception apparatus 5A (S15). In the content reception apparatus 5A, the group key Kgb is obtained by decrypting the encrypted group key Kgb using the master key Kma stored in the security module SM3, and is retained in the security module SM3A (S16).

In the case in which the group key Kgb is distributed using the airwave, the group key Kgb is encrypted using the master key Kma, and is distributed as the EMM (for distribution of Kg) shown in FIG. 6. The EMM (for distribution of Kg) is configured by the broadcaster ID, the card ID, the revision number, the expiry date, the group key ID, and the group key Kg. The content transmission apparatus 3 correlates the group key Kgb with the card ID, and stores the group key Kgb in the master key group key database (S17).

This embodiment realizes the following effects.

The content transmission apparatus 3 encrypts the content into encrypted content using the scrambling key Ks that changes as time passes. The scrambling key Ks is also encrypted by the content transmission apparatus 3 with the related information about the content using the content key provided to each content, thereby to obtain the encrypted related information. The content key is also encrypted by the content transmission apparatus 3 with the related information about the content key using the work key Kw retained for a longer time than the duration of the content. Additionally, the work key is encrypted by the content transmission apparatus 3 with the related information about the work key Kw using the master key Km commonly provided at the receiver side, thereby to obtain the encrypted work key related information. These items of encrypted information are multiplexed by the content transmission apparatus 3, and are transmitted to the content reception apparatus 5.

In the content reception apparatus 5, the multiplexed encrypted content is received by the separating unit 13. The separating unit 13 separates received multiplexed encrypted content into the encrypted content, the encrypted related information, the encrypted content key related information, and the encrypted work key related information. The content descrambling unit 15 (15a-15d) obtains the work key by decrypting the encrypted work key related information using the master key, obtains the content key by decrypting the encrypted content key related information using this work key, obtains the scrambling key by decrypting the encrypted related information using this content key, and obtains the content by decrypting the encrypted content using this scrambling key.

Contents are scrambled or descrambled using a scrambling key Ks by a content, and the scrambling key Ks is encrypted using the content key. Accordingly, the content key improves the efficiency in the descrambling of the scrambled content, and the work key Kw makes it easy to control the encryption keys when descrambling. Furthermore, the broadcaster can surely and easily collect a reception fee that is incurred when the user reproduces a pay content.

A content key related information storage designating means designates one of the security modules SM, the storage unit 17a, or the nonvolatile memory FM as the location at which the content key related information is stored. Since the content key stored at the receiver side is encrypted, it is possible to protect the copyright of the contents.

The contents are encrypted and decrypted using a four-level key structure (including the content key) instead of the conventional three-level key structure (the scramble key Ks, the work key Kw, and the master key Km). Not only are fixed encryption keys for a file system used but so are variable keys (the scrambling key Ks and the work key Kw) that change as time passes. The use of the variable keys protects the encrypted content from unauthorized reception.

The number of cryptography keys, that is, the content keys, to be stored in the content reception apparatus 5 increases considerably because the contents are encrypted and decrypted by a content. To avoid this problem, the content reception apparatus 5 is constructed so that it can not only store the content keys in the security module SM but also encrypt the content keys and store them in the storage unit 17a of the content reception apparatus 5. Accordingly, the content keys can be stored without degrading their security.

It is possible to reduce the amount of data to be transmitted by transmitting the encrypted content keys using the key (the master key Km) that is common to the content reception apparatuses 5 without transmitting to each content reception apparatus 5 individually, a large amount of key information (the encrypted related information, the content key related information, and the work key related information) that is generated by encrypting the content keys by a content.

The content is encrypted when it is stored in the storage medium (the nonvolatile memory FM). The user cannot reproduce the content unless the user has the combination of the valid security module SM and the content reception apparatus 5. Accordingly, the encrypted content is protected from unauthorized reception.

Even if an unauthorized user duplicates the storage medium (the nonvolatile memory FM), the unauthorized user cannot descramble the content because the unauthorized user cannot duplicate the security module SM, and consequently, does not have the combination of the storage medium and the security module SM.

In the case in which a plurality of users each having the content reception apparatus 5 share the common card ID of the security modules SM, the users can exchange the contents of the content reception apparatuses 5 and the security modules SM within the scope of fair use (personal use).

The content reception apparatus 5 and the storage apparatus (the storage unit 17a or an external storage apparatus) in which the encrypted content is stored are constructed without any intrinsic ID or secret portion provided therein. Accordingly, any manufacturer who manufactures reception apparatuses such as the content reception apparatuses 5 can freely manufacture them.

A preferred embodiment of the present invention is described above. The present invention, however, is not limited to the above embodiment. It is possible to regard the components of the content transmission apparatus 3 and the content reception apparatus 5 as a content transmission program and a content reception program, respectively, written in a general programming language. In this case, the same effects are obtained as those of the content transmission apparatus 3 and the content reception apparatus 5. It is further possible to store these programs in a recording medium (a flexible disk, a CD-ROM, for example) and put them in sales channels.

According to the invention referred to in claim 1, the content to be transmitted is encrypted into the encrypted content using the scrambling key. The scrambling key is encrypted into the encrypted related information using the content key with the related information related to the content. Additionally, the content key is encrypted into the encrypted content key related information using the master key with the related information related to the content key. Then, these items of information are multiplexed and transmitted. Accordingly, the multiplexed encrypted content is descrambled by a content, and the efficiency of descrambling is improved compared to conventional descrambling by a stream.

According to the invention referred to in claim 2, the content to be transmitted is encrypted into the encrypted content using the scrambling key. The scrambling key is encrypted into the encrypted related information using the content key with the related information related to the content. Additionally, the content key is encrypted into the encrypted content key related information using the work key with the related information related to the content key. The work key is encrypted into the encrypted work key related information using the master key with the related information related to the work key. Then, these items of information are multiplexed and transmitted. Accordingly, the multiplexed encrypted content is descrambled by a content at the receiver side, which improves the efficiency of descrambling compared to conventional descrambling by a stream.

According to the invention referred to in claim 3, after the content to be transmitted is transmitted as the multiplexed encrypted content, the encrypted content key related information transmitting means transmits separately the encrypted content key related information. Accordingly, necessary to strictly manage the encryption keys (content key) to be used for descrambling of the encrypted content is lowered, which makes the management of the encryption keys easy.

According to the invention referred to in claim 4, in the case in which security modules are provided to the receiver side, the security modules are grouped, and a corresponding work key is provided to each group.

Accordingly, it is possible to easily manage the decrypted content key using the work key corresponding to each group.

According to the invention referred to in claim 5, the content key related information storage designating means designates either the security module, the storing means, or the storage medium to a position at which the content key related information is retained at the receiver side. Accordingly, the receiver side can designate the position at which the encryption key is stored depending on the memory capacity of the security module, the storing means, and the storage medium, and the importance of the encryption key, which makes the management of the encryption key easy.

According to the invention referred to in claim 6, in the case in which the encrypted content is reproduced at the receiver side, and the content key related information including the content key corresponding to the scramble key for descrambling the encrypted content is transmitted, the content key related information use designating means designates the stored content key related information not to use the transmitted content key related information. Accordingly, since the content key to be used for the decryption of the encrypted content is designated, the unauthorized reception and use of the content becomes difficult, which protects the copyright of the content.

According to the invention referred to in claim 7, when a security module is provided at the receiver side, the intrinsic key to be set in the security module is encrypted by the intrinsic key setting related information encrypting means of the transmitter side using the master key and transmitted as the encrypted intrinsic key setting related information. Accordingly, the transmitter side can freely change the intrinsic key set in the security module.

According to the invention describe in claim 8, since a common intrinsic key is set in another security module of the receiver side, the information (the content key related information, for example) stored in one security module can be output using the other security module using the common intrinsic key. Accordingly, in the case in which a plurality of reception apparatuses at the receiver side can share the identifier of the security module, it is possible to exchange the used reception apparatus and the used security module with each other.

According to the invention referred to in claim 9, the multiplexed encrypted content receiving means receives the multiplexed encrypted content multiplexed at the transmitter side. The multiplexed encrypted content separating means separates the received multiplexed encrypted content into the encrypted content, the encrypted related information, and the encrypted content key related information. Then, the multiplexed encrypted content decrypting means obtains the content by decrypting the encrypted content. Accordingly, since the multiplexed encrypted content is descrambled by a content, the efficiency of the descrambling can be improved compared to conventional descrambling by a stream.

According to the invention referred to in claim 10, the multiplexed encrypted content multiplexed at the transmitter side is received by the multiplexed encrypted content receiving means. The received multiplexed encrypted content is separated by the multiplexed encrypted content separating means into the encrypted content, the encrypted related information, the encrypted content key related information, and the encrypted work key related information. Then, by use of the multiplexed encrypted content decrypting means, the work key is obtained by decrypting the encrypted work key related information using the master key; the content key is obtained by decrypting the encrypted content key related information using this work key; the scrambling key is obtained by decrypting the encrypted related information using this content key; and the content is obtained by decrypting the encrypted content using this scrambling key. Accordingly, because the multiplexed encrypted content is descrambled by a content, the efficiency of descrambling can be improved compared to conventional descrambling by a stream.

According to the invention referred to in claim 11, in the case in which the encrypted content key related information is not obtained, the encrypted content key related information requesting means requests the encrypted content key related information including the content key from the transmitter side. Accordingly, when reproducing the content, the receiver side can obtain the content key if necessary.

According to the invention referred to in claim 12, the decrypted content key related information and the content identifier for identifying the content are stored, by use of the content key related information storing means, in the security module in which the master key is set. Accordingly, the content is protected, and as a result, the copyright of the content can be protected.

According to the invention referred to in claim 13, the decrypted content key related information and the content identifier for identifying the content are stored, by use of the content key related information storing means, in the security module in which the master key and the intrinsic key are set. Accordingly, the content key is protected, and as a result, the copyright of the content can be protected.

According to the invention referred to in claim 14, a security module in which the master key and the intrinsic keys are set shares at least one common intrinsic key with another security module. It is possible to output information (content key related information, for example) stored in one security module with the other security module using the common intrinsic key. Accordingly, since the identifier of the security module can be shared between a plurality of reception apparatuses, it is possible to exchange the reception apparatuses and the security modules with each other within the scope of fair use.

According to the invention referred to in claim 15, in the case in which the intrinsic key is set in the security module, the encrypted intrinsic key setting related information receiving means receives the encrypted intrinsic setting related information encrypted using the master key at the transmitter side, and the intrinsic key is obtained by decrypting the encrypted intrinsic key setting related information by use of the encrypted intrinsic key setting related information decrypting means. Accordingly, since the intrinsic key set in the security module can be changed freely by the transmitter side, the copyright of the content can be protected.

According to the invention referred to in claim 16, in a case in which a memory capacity more than memory capacity of the security module is required, the content key related information deleting means deletes the content key related information based on a time at which the content key related information is stored and information set by the transmitter side or the receiver side. Accordingly, the management of the content key becomes easy.

According to the invention referred to in claim 17, the decrypted content key related information is output and stored by the content key related information output storing means. Accordingly, the management of the content key becomes easy.

According to the invention referred to in claim 18, in the case in which the memory capacity of the storing means is exceeded, the content key related information deleting means deletes the content key related information based on a time at which the content key related information is stored and the information set by the transmission side or the reception side. Accordingly, the management of the content key becomes easy.

According to the invention referred to in claim 19, the content key related information re-encrypting storing means re-encrypts, using the master key, outputs, and stores the decrypted content key related information stored in the security module. Accordingly, the content key is protected, and as a result, the copyright of the content can be protected.

According to the invention referred to in claim 20, in the case in which the memory capacity of the storing means is exceeded, the re-encrypted content key related information deleting means deletes the re-encrypted content key related information based on a time at which the content key related information is stored and the information set by the transmission side or the reception side. Accordingly, the management of the content key becomes easy.

According to the invention referred to in claim 21, the content key related information intrinsic encryption storing means re-encrypts the decrypted content key related information stored in the security module, and output and stores it as the intrinsic encrypted content key related information. Accordingly, the content key is protected, and as a result, the copyright of the content can be protected.

According to the invention referred to in claim 22, in the case in which the memory capacity of the storing means is exceeded, the intrinsic encryption content key related information deleting means deletes the intrinsic encryption content key related information based on a time at which the intrinsic encryption content key related information is stored and the information set by the transmission side or the reception side. Accordingly, the management of the content key becomes easy.

The decrypted content key related information stored in the security module is encrypted by the storage medium handling means using the master key, and is stored with the encrypted content as the re-encrypted content key related information in the storage medium. Accordingly, the content key is protected, and as a result, the copyright of the content can be protected.

The decrypted content key related information stored in the security module is encrypted by the storage medium handling means using the intrinsic key, and stored with the encrypted content as the intrinsic encryption content key related information in the storage medium. Accordingly, the content key is protected, and as a result, the copyright of the content can be protected.

The encrypted content related information storing means stores the encrypted content and the encrypted related information corresponding to this encrypted content in the storage medium. The related information inputting means inputs the re-encrypted content key related information stored in the storing means or the storage medium to the security module. The scrambling key outputting means obtains the content key by decrypting the re-encrypted content key related information, and obtains the scrambling key by decrypting the encrypted related information using this content key. The encrypted content decrypting means decrypts the encrypted content. Accordingly, when the encrypted content is reproduced, the content key needs to be obtained through a complex process, which advantageously results in the copyright protection of the contents.

The encrypted content related information storing means stores the encrypted content and the encrypted related information corresponding to this encrypted content in the storage medium. The related information inputting means inputs the intrinsic encryption content key related information stored in the storing means or the storage medium in the security module. The scrambling key outputting means obtains the content key by decrypting the intrinsic encryption content key related information, and obtains the scrambling key by decrypting the encrypted related information using this content key. The encrypted content decrypting means decrypts the encrypted content. Accordingly, when the encrypted content is reproduced, the content key needs to be obtained through a complex process, which advantageously results in the copyright protection of the contents.

In the case in which the encrypted content is not stored by the content key un-storing means, the content key corresponding to this encrypted content, that is, the encrypted content key related information, is not stored. Accordingly, the encrypted content separately stored cannot be reproduced, which advantageously results in the copyright protection of contents.

The content key switching means switches the timing of decrypting the encrypted related information using the content key based on the time at which the content starts to be transmitted and the time at which the content is finished being transmitted. If the receiver side already obtains the content key, the content can be decrypted from the time at which the content starts to be transmitted to the time at which the content is finished being transmitted.

According to another example embodiment, the content to be transmitted is encrypted into the encrypted content using the scrambling key that changes as time passes. The scrambling key is encrypted into the encrypted related information using the content key provided to each content with the related information related to the content. Additionally, the content key is encrypted into the encrypted content key related information using the work key that is retained for a time period longer than the duration of the content with the related information related to the content key. The work key is encrypted into the encrypted work key related information using the master key provided commonly to the receiver side with the related information related to the work key. Then, these items of information are multiplexed and transmitted. Accordingly, since the multiplexed encrypted content is descrambled by a content at the receiver side, the efficiency of descrambling is improved compared to conventional descrambling by a stream.

According to another example embodiment, the multiplexed encrypted content multiplexed at the transmitter side is received by the multiplexed encrypted content receiving means. The received multiplexed encrypted content is separated by the multiplexed encrypted content separating means into the encrypted content, the encrypted related information, the encrypted content key related information, and the encrypted work key related information. Then, by use of the multiplexed encrypted content decrypting means, the work key is obtained by decrypting the encrypted work key related information using the master key; the content key is obtained by decrypting the encrypted content key related information using this work key; the scrambling key is obtained by decrypting the encrypted related information using this content; and the content is obtained by decrypting the encrypted content using this scrambling key. Accordingly, since the multiplexed encrypted content is descrambled by a content, the efficiency of descrambling is improved compared to conventional descrambling by a stream.

The invention claimed is:

1. A content transmission apparatus that encrypts and transmits contents of digital broadcasting, comprising:
   a storage unit provided with a memory to store a scrambling key that changes as time passes, a content key provided to each content, a network key retained for a time period longer than a duration of the contents, and a master key provided commonly to a receiver side;
   a content encryption unit configured to encrypt the contents using the scrambling key into encrypted contents;
   a related information encryption unit configured to encrypt first information related to the contents, the first information including at least the scrambling key using the content key into encrypted related information;
   a content key related information encryption unit configured to encrypt second information related to the content key, the second information including at least the content key using a work key into encrypted content key related information;
   a work key related information encryption unit configured to encrypt third information related to the work key, the third information including at least the work key using the encrypted work key related information into encrypted work key related information;
   a multiplexer unit configured to multiplex the encrypted work key related information, the encrypted content key related information, and the encrypted contents; and
   a multiplexed encrypted content transmission unit configured to transmit the multiplexed encrypted contents multiplexed by the multiplexer unit,
   wherein if a plurality of security modules are correspondingly provided in reception apparatuses at the receiver side, each security module storing decrypted content key related information and being unreadable from exterior, the plurality of security modules being grouped into a plurality of groups, different work keys are used for different groups of the plurality of security modules,
   each security module has a plurality of intrinsic keys for encrypting information outputted form the security module, and
   the content transmission apparatus further comprises an intrinsic key related information encryption unit configured to encrypt the plurality of intrinsic keys into encrypted intrinsic key related information using the master key.

2. A content transmission apparatus that encrypts and transmits contents of digital broadcasting, comprising:
   a storage unit provided with a memory to store a scrambling key that changes as time passes, a content key provided to each content, a work key retained for a time period longer than a duration of the scrambling key into encrypted contents;
   a related information encryption unit configured to encrypt first information related to the contents, the first information including at least the scrambling key, using the content key into encrypted related information;
   a content key related information encryption unit configured to encrypt second information related to the content key, the second information including at least the content key using the work key into encrypted content key related information;
   a work key related information encryption unit configured to encrypt third information related to the work key, the third information including at least the work key using the master key into encrypted work key related information;

a multiplexer unit configured to multiplex the encrypted content, the encrypted related information, and the encrypted work key related information into multiplexed encrypted contents;

a multiplexed encrypted content transmission unit configured to transmit the multiplexed encrypted contents multiplexed by the multiplexer unit; and an encrypted content key related information transmission unit configured to repeatedly transmit the encrypted content key related information for a predetermined time period after said multiplexed encrypted content transmitting means starts transmitting the multiplexed encrypted contents or for a time period a predetermined time period before said multiplexed encrypted content transmitting means starts transmitting the multiplexed encrypted contents or, if the receiving side has not received the encrypted content key related information, to transmit the encrypted content key related information in response to a request from the receiving side, or to transmit the encrypted content key related information via a communication network, wherein if a plurality of security modules are correspondingly provided in receivers at the receiver side, each security module storing decrypted content key related information and being unreadable from exterior, the plurality of security modules being grouped into a plurality of groups, different work keys are used for different groups of the plurality of security modules, each security module has a plurality of intrinsic keys for encrypting information outputted form the security module, and the content transmission apparatus further comprises an intrinsic key related information encryption unit configured to encrypt the plurality of intrinsic keys into encrypted intrinsic key related information using the master key.

3. The content transmission apparatus as claimed in claim 1, further comprising a content key related information storage designation unit that, when said encrypted content key related information is decrypted into content key related information at the receiver side, and said content key related information is stored as is, or after being re-encrypted, in a case in which a reception apparatus of said receiver side is provided with at least one of a storing means or a storage medium handling means that handles a storage medium, designates one of said security module, said storing means, and said storage medium to retain said content key related information.

4. The content transmission apparatus as claimed in claim 1, further comprising a content key related information use designation unit that, in a case in which a storage medium handling unit is provided at a receiver side, and said encrypted content is stored therein and said encrypted content is reproduced, if an encrypted content key related information corresponding to said encrypted content is already transmitted, does not use said encrypted content key related information and designates stored content key related information.

5. The content transmission apparatus as claimed in claim 1, wherein at least one of the plurality of intrinsic keys is common to other security modules.

6. A content reception apparatus that receives encrypted contents of digital broadcasting, encrypted at a transmitter side, comprising:

a memory that stores encrypted content;

a multiplexed encrypted content reception unit configured to receive a multiplexed encrypted content containing:

encrypted contents into which the contents are encrypted using a scrambling key that changes as time passes;

encrypted related information into which first information related to the contents is encrypted, the first information including at least the scrambling key, using a content key provided to each content;

encrypted content key related information into which second information related to the content key is encrypted, the second information including at least the content key, using a work key retained for a time period longer than a duration of the contents; and encrypted work key related information into which third information related to the work key is encrypted, the third information including at least the work key, using a master key provided commonly to a receiver side, wherein the encrypted contents, encrypted related information , encrypted content key and encrypted work key are multiplexed, the content reception apparatus further comprising:

a multiplexed encrypted content demultiplexer unit configured to demultiplex the multiplexed encrypted content received by the multiplexed encrypted content reception unit, into the encrypted content, the encrypted related information, the encrypted content key related information and the encrypted work key related information;

a multiplexed encrypted content decryption unit configured to decrypt the encrypted work key related information using the master key to obtain the work key, the encrypted content key related information using the obtained work key to obtain the content key, the encrypted related information using the obtained content key to obtain the content key, the encrypted related information using the obtained content key to obtain the scrambling key, and the encrypted content using the obtained scrambling key to obtain the content;

a content key related information storage unit, provided with a security module storing the master key and being unreadable from exterior, the content key related information storage unit configured to store decrypted content key related information and a content identifier associated with the decrypted content key related information for identifying the content, wherein a plurality of security modules are correspondingly provided in content reception apparatuses at the receiver side, the plurality of security modules being grouped into a plurality of groups, and different work keys are used for different groups of the plurality of security modules, wherein each of the security modules has a plurality of intrinsic keys for encrypting information outputted from the security modules, and the content reception apparatus further comprises a decrypted content key using one of the plurality of intrinsic keys.

7. A content reception apparatus that receives encrypted contents of digital broadcasting, encrypted at a transmitter side comprising:

a memory that stores encrypted content;

a multiplexed encrypted content reception unit configured to receive a multiplexed encrypted content containing:

encrypted contents into which the contents are encrypted using a scrambling key that changes as time passes;

encrypted related information into which first information related to the contents is encrypted, the first information including at least the scrambling key, using a content key provided to each content;

encrypted content key related information into which second information related to the content key is encrypted, the second information including at least the content key, using a work key retained for a time period longer than a duration of the contents; and encrypted work key related information into which third information related to the work key is encrypted, the third information including at least the work key, using a master key provided commonly to a receiver side, wherein the encrypted contents, encrypted related information, encrypted content key and encrypted work key are multiplexed, the content reception apparatus further comprising:

a multiplexed encrypted content demultiplexer unit configured to demultiplex the multiplexed encrypted content received by said multiplexed encrypted content reception unit, into the encrypted content, the encrypted related information, and the encrypted work key related information;

a multiplexed encrypted content decryption unit configured to decrypt the encrypted work key related information using the master key to obtain the work key, the encrypted content key related information using the obtained work key to obtain the content key, the encrypted related information using the obtained content key to obtain the scrambling key, and the encrypted content using the obtained scrambling key to obtain the content;

a content key related information storage unit, provided with a security module storing the master key and a intrinsic key for encrypting information to be output and being unreadable from exterior, the content key related information storage unit configured to store decrypted content key related information and a content identifier associated with the decrypted contend key related information for identifying the content;

wherein a plurality of security modules are correspondingly provided in content reception apparatuses at the receiver side, the plurality of security modules being grouped into a plurality of groups, and different work keys are used for different groups of the plurality security modules, wherein each of the security modules has a plurality of intrinsic keys for encrypting information outputted from the security modules, and the content reception apparatus further comprises a decrypted content key using one of the plurality of intrinsic keys.

8. The content reception apparatus as claimed in claim 6, further comprising an encrypted content key related information request unit that, if the encrypted content key related information is not received, requests the encrypted content key related information from the transmitter side.

9. The content reception apparatus as claimed in claim 7, wherein at least one of the intrinsic keys is set commonly to another security module.

10. The content reception apparatus as claimed in claim 7, further comprising:

an encrypted intrinsic key setting related information reception unit configured to receive encrypted intrinsic key setting related information, wherein the transmitter side encrypts a plurality of intrinsic keys into the encrypted intrinsic key setting related information; and an encrypted intrinsic key setting related information, decryption unit configured to decrypt using the master key, the encrypted intrinsic key setting related information received by the encrypted intrinsic key setting related information reception unit.

11. The content reception apparatus as claimed in claim 6, further comprising a content key related information deletion unit that, in a case in which the decrypted content key related information requires more memory capacity than that which the security module can store, deletes the decrypted content key related information based on a time at which said decrypted content key related information is stored and information set by the transmitter side or the receiver side.

12. The content reception apparatus as claimed in claim 6, further comprising a content key related information output storage unit configured to output and store the decrypted content key related information stored in the security module.

13. The content reception apparatus as claimed in claim 12, further comprising a content key related information deletion unit that, in a case in which the decrypted content key related information requires more memory capacity than that which the storage unit can store, deletes the decrypted content key related information base on a time at which said decrypted content key related information is stored and information set by the transmitter side of the receiver side.

14. The content reception apparatus as claimed in claim 6, further comprising a content key related information re-encryption storing means for encrypting the decrypted content key related information stored in the security module using the master key, and outputting and storing the encrypted content key related information as re-encrypted content key related information.

15. The content reception apparatus as claimed in claim 14, further comprising a re-encrypted content key related information deletion unit that, in a case in which the re-encrypted content key related information and a content identifier for identifying a content require more memory capacity than that which the storage unit can store, deletes the re-encrypted content key related information based on a time at which the re-encrypted content key related information is stored or information set by the transmitter side or the receiver side.

16. The content reception apparatus as claimed in claim 6, further comprising a content key related information intrinsic encryption storage unit configured to store, using said intrinsic keys, the decrypted content key related information stored in the security module into an intrinsic encrypted content key related information, and output and store the intrinsic encrypted content key related information.

17. The content reception apparatus as claimed in claim 16, further comprising an intrinsic encrypted content key related information deletion unit that, in a case in which the intrinsic encrypted content key related information and a content identifier for identifying a content require more memory capacity than that which the storage unit can store, deletes the intrinsic encrypted content key related information based on a time at which the intrinsic encrypted content key related information is stored or information set by the transmitter side or the receiver side.

18. The content reception apparatus as claimed in claim 6, further comprising a storage medium handling unit configured to store re-encrypted content key related information with a corresponding encrypted content;

wherein the decrypted content key related information is re-encrypted into the re-encrypted content key related information using the master key.

19. The content reception apparatus as claimed in claim 7, further comprising a storage medium handling unit configured to store intrinsic encrypted content key related information with a corresponding encrypted content;
wherein the decrypted content key related information is re-encrypted into the re-encrypted content key related information using the intrinsic keys.

20. The content reception apparatus as claimed in claim 6, wherein the memory that store encrypted content comprises an encrypted content storage unit provided with a storing means and a storage medium handling means, that stores, in a storage medium handled by the storage medium handling means, encrypted content encrypted using the scrambling key and encryption related information related to the content including a content identifier for identifying the encrypted content;

and said content reception apparatus further comprises:
a related information input unit, wherein in a case in which, when the encrypted content stored in the storage medium is reproduced, the re-encrypted content key related information corresponding to the encrypted content is stored in at least one of the storing means and the storage medium, the related information input unit reads and inputs, in the security module, the re-encrypted content related information from the storing means or the storage medium, and inputs the encrypted related information;
a scrambling key output unit that obtains the content key by decrypting the re-encrypted content key related information using the master key, obtains the scrambling key by decrypting the encrypted related information using the content key, and outputs the scrambling key; and an encrypted content decryption unit configured to decrypt the encrypted content stored in the storage medium using the scrambling key outputted by the scrambling key output unit.

21. The content reception apparatus as claimed in claim 7, wherein the memory that store encrypted content comprises:
an encrypted content storage unit provided with a storing means and a storage medium handling means, that stores, in a storage medium handled by the storage medium handling means, encrypted content encrypted using the scrambling key and encryption related information related to the content including a content identifier for identifying the encrypted content;

and said content reception apparatus further comprises:
a related information, wherein in a case in which, when the encrypted content stored in the storage medium is reproduced, the intrinsic encrypted content key related information corresponding to the encrypted content is stored in at least one of the storing means and the storage medium, the related information input unit reads and inputs, in the security module, the intrinsic encrypted content related information from the storing means or the storage medium, and inputs the encrypted related information;
a scrambling key output unit that obtains the content key by decrypting the intrinsic encrypted content key related information using the intrinsic key, obtains the scrambling key by decrypting the encrypted related information using the content key, and outputs the scrambling key; and
an encrypted content decryption unit configured to decrypt the encrypted content stored in the storage medium using the scrambling key outputted by the scrambling key output unit.

22. The content reception apparatus as claimed in claim 6, further comprising a content key un-storing unit that, in a case in which the encrypted content is not stored during transmission of the encrypted content, does not store content key corresponding to the encrypted content.

23. The content reception apparatus as claimed in claim 6, further comprising a content key switch unit configured to switch the content key based on a time at which a content corresponding to the encrypted related information starts to be transmitted and a time at which the content is finished being transmitted.

24. The content transmission apparatus as claimed in claim 2, wherein at least one of the plurality of intrinsic keys is common to other security modules.

* * * * *